United States Patent
Schwartz et al.

(10) Patent No.: US 10,285,208 B2
(45) Date of Patent: May 7, 2019

(54) VARIOUS TRAFFIC MANAGEMENT METHODS FOR DYNAMIC MULTI-HOP BACKHAULING CELLULAR NETWORK AND SYSTEMS USEFUL IN CONJUNCTION THEREWITH

(75) Inventors: Adi Schwartz, Holon (IL); Yaakov Shoshan, Ashkelon (IL); Gil Koifman, Petach Tikva (IL)

(73) Assignee: ELTA SYSTEMS LTD., Ashdod (IL)

( * ) Notice: Subject to any disclaimer, the term of this patent is extended or adjusted under 35 U.S.C. 154(b) by 177 days.

(21) Appl. No.: 13/989,693

(22) PCT Filed: Nov. 23, 2011

(86) PCT No.: PCT/IL2011/050023
§ 371 (c)(1),
(2), (4) Date: Aug. 28, 2013

(87) PCT Pub. No.: WO2012/070045
PCT Pub. Date: May 31, 2012

(65) Prior Publication Data
US 2013/0336199 A1    Dec. 19, 2013

Related U.S. Application Data

(60) Provisional application No. 61/417,045, filed on Nov. 24, 2010.

(51) Int. Cl.
*H04W 76/12*  (2018.01)
*H04W 28/02*  (2009.01)
(Continued)

(52) U.S. Cl.
CPC ........ *H04W 76/12* (2018.02); *H04B 7/15507* (2013.01); *H04W 16/26* (2013.01);
(Continued)

(58) Field of Classification Search
None
See application file for complete search history.

(56) References Cited

U.S. PATENT DOCUMENTS

| | | |
|---|---|---|
| 5,657,317 A | 8/1997 | Mahany et al. |
| 5,729,826 A | 3/1998 | Gavrilovich |
| (Continued) | | |

FOREIGN PATENT DOCUMENTS

| | | |
|---|---|---|
| EP | 1 804 430 A1 | 7/2007 |
| EP | 1 912 390 A1 | 4/2008 |
| (Continued) | | |

OTHER PUBLICATIONS

Telecom Dictionary: Term: "Bearer"; http://www.telecomdictionary.com/Telecom_Dictionary_Definitions.asp; 2018 (Year: 2018).*

(Continued)

*Primary Examiner* — Joshua Kading
(74) *Attorney, Agent, or Firm* — Oliff PLC

(57) ABSTRACT

In a mobile communication system including a network having at least one base station operative to receive information in resource allocation terminology understandable to the base station and to allocate downlink bandwidth accordingly, at least one relay operative to convey to the base station information regarding needs of mobile communicators associated with the relay, using the resource allocation terminology understandable to the base station, and when receiving uplink bandwidth, from the base station, which generates an uplink between itself and the base station, to distribute the uplink bandwidth between the mobile communicators associated with the relay.

14 Claims, 31 Drawing Sheets

(51) Int. Cl.
*H04W 28/24* (2009.01)
*H04W 16/26* (2009.01)
*H04B 7/155* (2006.01)
*H04W 72/04* (2009.01)
*H04W 72/08* (2009.01)
*H04W 84/04* (2009.01)

(52) U.S. Cl.
CPC ....... *H04W 28/0268* (2013.01); *H04W 28/24* (2013.01); *H04W 72/0406* (2013.01); *H04W 72/085* (2013.01); *H04W 84/047* (2013.01)

(56) References Cited

U.S. PATENT DOCUMENTS

| | | |
|---|---|---|
| 6,678,524 B1 | 1/2004 | Hansson et al. |
| 2006/0182018 A1 | 8/2006 | Bahk et al. |
| 2008/0165719 A1* | 7/2008 | Visotsky ............. H04B 7/2606 370/315 |
| 2008/0261602 A1* | 10/2008 | Livneh ......................... 455/442 |
| 2009/0147731 A1 | 6/2009 | Chion et al. |
| 2009/0264123 A1 | 10/2009 | Agashe et al. |
| 2010/0238826 A1 | 9/2010 | Borran et al. |
| 2011/0051684 A1* | 3/2011 | Li et al. ......................... 370/331 |
| 2011/0235514 A1* | 9/2011 | Huang ............... H04B 7/15528 370/235 |
| 2012/0120831 A1* | 5/2012 | Gonsa .................. H04W 76/15 370/252 |
| 2012/0307633 A1* | 12/2012 | Collings ........... H04W 72/0486 370/230 |
| 2013/0143574 A1* | 6/2013 | Teyeb ............... H04W 36/0011 455/438 |
| 2013/0336199 A1 | 12/2013 | Schwartz et al. |

FOREIGN PATENT DOCUMENTS

| | | |
|---|---|---|
| EP | 1 981 223 A1 | 10/2008 |
| EP | 2 161 945 A1 | 3/2010 |
| WO | 2008/011717 A1 | 1/2008 |
| WO | 2008/036784 A2 | 3/2008 |
| WO | 2008/106797 A1 | 9/2008 |
| WO | 2010/086023 A1 | 8/2010 |
| WO | 2010/121661 A1 | 10/2010 |
| WO | 2011/092698 A1 | 8/2011 |
| WO | 2011/158230 A2 | 12/2011 |
| WO | 2012/014194 A2 | 2/2012 |

OTHER PUBLICATIONS

Chen et al., "Joint Power and Bandwith Allocation in Multihop Wireless Networks," IEEE Communications Society, Wireless Communications and Networking Conference, 2008, WCNC 2008, pp. 990-995.
"Configuration of Uu to Un Bearer Mapping," Qualcomm Incorporated, 3GPP TSG-RAN WG2 Meeting #71, Madrid, Spain, Aug. 23-27, 2010, pp. 1-5.
Yang et al., "A New Relay Based Dynamic Load Balancing Scheme in Cellular Networks," IEEE, Vehicular Technology Conference Fall 2010, Piscataway, NJ, USA, Sep. 6, 2010.
Zhu et al., "Load Balancing Based on Velocity and Position in Multitier Cellular System," IEEE, Consumer Communications and Networking Conference, 2006, Las Vegas, NV, USA, Jan. 8-10, 2006, pp. 463-467.
"Multi-Bearer Network" definition, Retrieved from the Internet: [http://en.wikipedia.org/w/index.php?title=Multi-bearer_network &oldid=367026251] dated Apr. 13, 2015.
"The LTE Network Architecture." Alcatel-Lucent. pp. 1-26, 2009.
Sesia, Stefania et al., "The UMTS Long Term Evolution: From Theory to Practice". pp. 1-794, 2011.
Wiley, John., "About Us". pp. 1-3, Yrs 2000-2018.
Copeland, Rebecca., "Converging NGN Wireline and Mobile 3G Networks with IMS". 2008.
Tao Huang et al., "QoS Mechanism in EPS". ZTE Corporation, pp. 1-7, 2009.
Chopping, Dominic., "Nokia, Alcael-Lucent Set to Put Merger to Work". Jan. 4, 2016.

* cited by examiner

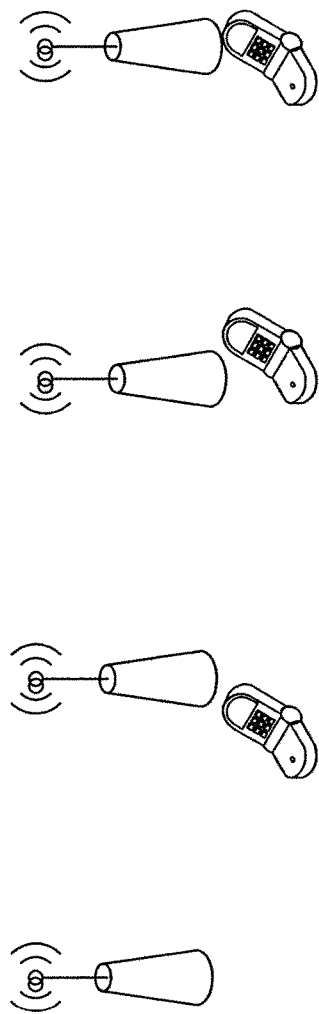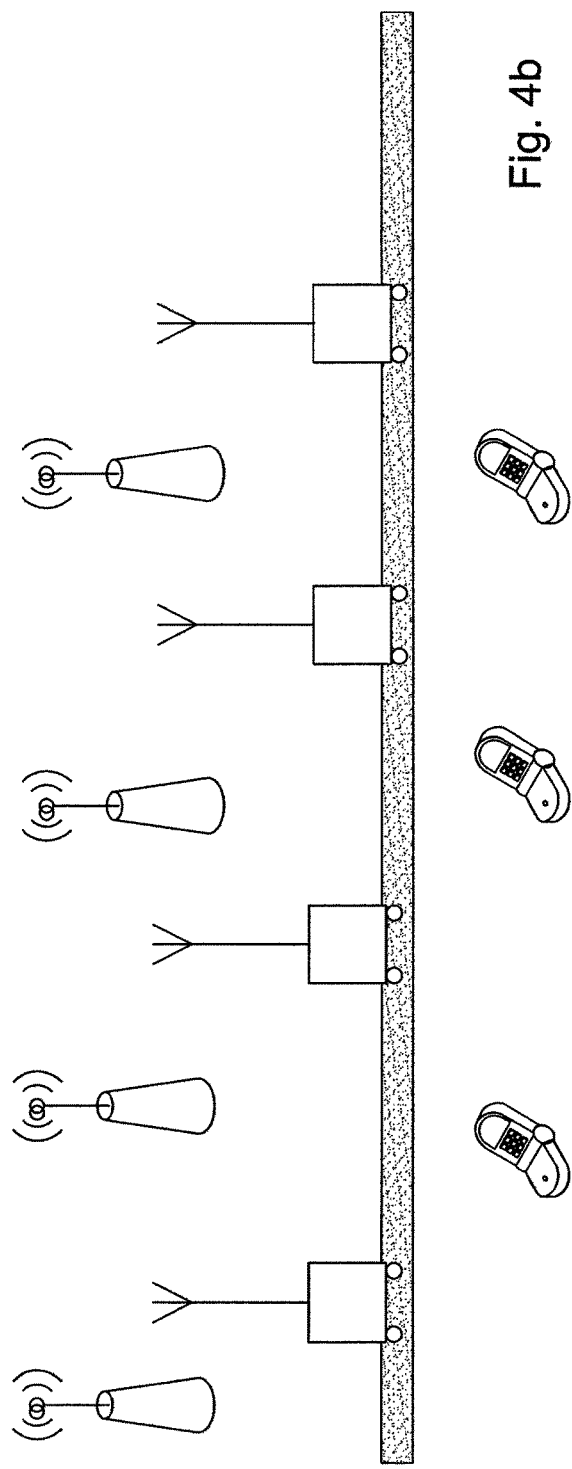

| | |
|---|---|
| RA | Moving relay agent having radio backhauling functionality as a core interface and base-station interface as an SM interface. Such as but not limited to the moving base stations e.g. MrS units described in Published PCT Patent Application WO/2011/092698, entitled "Cellular Communication System With Moving Base Stations And Methods And Apparatus Useful In Conjunction Therewith" |
| BS | Stationary, typically conventional base-station, able to communicate e.g. conventionally with the core and with mobile communication device users |
| SM | Mobile communication device e.g. Standard mobile phone |
| Node | BS or RA or other node, typically not including endpoint nodes (phones), in a cellular communication network |
| Link | A potential connection between two nodes |
| Active link | A link that is currently being used to pass e.g. packets between two nodes |
| Link state | Quality grade e.g. indicating the potential information-to-noise ratio of a link |
| User | User of the mobile phones, which typically dynamically move across the service zone of the network |
| QOS | A parameter set of an application or user expressing a priority of that application or user relative to other applications or users served by the same cellular |

Fig. 17a

| | |
|---|---|
| | communication network. The QOS may for example indicate different delay, error rate and/or guaranteed bit rate requirements |
| Core | Responsible for overall control of the SM and establishment of services |
| Resource allocation chain | A cellular network resource allocation, also termed herein "service establishment" or "service requirements establishment", typically allocated by each of a chain of cellular communication network nodes connecting two end-point nodes in the network, that guarantees at least one requirement (such as but not limited to QoS, bandwidth, minimum delay, maximal error rate) of a communication session between the two end-point nodes. An example Resource allocation chain is a bearer as defined in conventional protocols such as GSM, UMTS and LTE. |
| PS | Packet switched |
| CS | Context switched |
| RS | Relay server, residing typically inside the core and responsible for overall control of the SM and RA in the hierarchical system |
| RH | Relay helper residing inside the RA and responsible for the control of the SM and RA that are actively linked to its RA or to descendent/s thereof |

Fig. 17b

VARIOUS TRAFFIC MANAGEMENT METHODS FOR DYNAMIC MULTI-HOP BACKHAULING CELLULAR NETWORK AND SYSTEMS USEFUL IN CONJUNCTION THEREWITH

REFERENCE TO CO-PENDING APPLICATIONS

This application claims priority from U.S. provisional application No. 61/417,045, entitled "Various Traffic Management Methods for Dynamic Multi-Hop Backhauling Cellular Network and Systems Useful in Conjunction Therewith", filed Nov. 24, 2010.

FIELD OF THE INVENTION

The present invention relates generally to communication systems and more particularly to mobile communication systems.

BACKGROUND OF THE INVENTION

Many cellular communication networks are known, e.g. hierarchical mobile systems as described in U.S. Pat. Nos. 5,657,317 to Mahany et al and 5,729,826 to Gavrilovich.

LTE and Wimax are known standards for mobile communication networks.

The disclosures of all publications and patent documents mentioned in the specification, and of the publications and patent documents cited therein directly or indirectly, are hereby incorporated by reference.

SUMMARY OF THE INVENTION

The embodiments shown and described herein are particularly useful in conjunction with vehicle fleets in which vehicles, such as busses or trains or taxis, are equipped with mobile base-stations which may function as relays, and/or mobile telephones or other cellular communication devices.

For example, in rural areas where sole reliance on fixed cellular base-station coverage limits the capacity of mobile stations at long ranges, mobile base stations that are installed on transportable mobile platforms e.g. busses, trains, taxis can enable high data-rate applications such as web-browsing, video-streaming, and can also be used as relays between other mobile base stations and fixed base stations. In addition, mobile base stations as described herein can be installed on-board airplanes to enable passengers to communicate with a fixed cellular infrastructure using their own cellular phones. Finally, if a mass attended event is expected or has occurred, it may be desired to send a fleet of mobile base-stations into the location of that event for the duration of the event. For example, event organizers, e.g. cultural or sports event organizers, may own or hire such a fleet which may be sent on one occasion to a first city in which a massively attended popular music concert or rally is being held and on another occasion to a location in which Olympics or another mass-attended sports event is planned.

In a typical cellular telephone system, e.g. as depicted in prior art FIG. 1, an area is divided into cells where each cell has a serving base station (BS). A mobile communication device moving in such a cellular network communicates by radio with the best base station (BS). The BSs communicate with the core network and with each other by either using a direct cable, or by using point-to-point microwave. Several procedures are common to all cellular telephone systems:

Handover is the procedure that runs when the mobile communication device moves between cells while it is in service.

Cell selection is the procedure that selects the best base station (BS) to link to.

A mobile ad-hoc network (MANET), e.g. as depicted in FIG. 2, is a well studied concept in prior art. MANET is defined as an autonomous system of mobile routes, their associated hosts being connected by wireless links, the union of which forms an arbitrary graph. Such networks have been introduced with little degree of success, due to many technical and organizational challenges such as delays, power consumption and scalability.

A hierarchical mobile system, e.g. as depicted in FIG. 3, has two radio-interface serving entities; base station (BS) and relay apparatus (RA). The BSs are static base stations and the relay apparatus (RA)s are moving base stations comprising a radio interface for a backhauling interface, and a base-station as a front end to the user. Due to dynamics in the hierarchical mobile system, it is difficult to use a directional antenna; therefore there is a need to use an omni antenna. The user can connect to a base station (BS) or to a relay apparatus (RA) using the same standard interface and is transparent to the kind that it is connected to.

In FIG. 3, mobile communication device s are numbered 03, 06, 07, 11 and 12. The relay apparatus (RA)s are numbered 02, 05 and 09. The BSs are numbered 01, 08 and 10. The core is numbered 4.

SM12 links to BS10, BS08 and RA09, its best link is to BS10 and therefore it has an active link to the BS10 and connects to the core through BS10. SM11 links to RA09 BS08 and BS10, its best link is to BS08 and therefore it has an active link to BS08. SM03 links to SB10, SB08 and RA09 its best link is to RA09 and therefore it has active link to RA09. SM06 links to RA09, RA05, RA02 and BS01 its best link is to RA09 and therefore it has active link to RA09. SM07 links to RA09, RA05, RA02 and BS01 its best link is to RA05 and therefore it has active link to RA05.

RA02 links to RA09, BS01 its best link is to BS01 and therefore it has active link to BS01. RA09 links to RA02, BS01 and BS08 its best link is to BS08 and therefore it has active link to BS08. RA05 links to RA02, BS01 and BS08 its best link is to BS02 and therefore it has active link to BS02.

Certain embodiments of the present invention seek to provide Uplink/Downlink Multi-user in-band backhauling prioritization based on QOS criteria.

Certain embodiments of the present invention seek to provide Load balancing in multi-hop relay architecture management based on network topology.

Certain embodiments of the present invention seek to provide Multi-hop encapsulation for uplink in-band backhauling, such encapsulation comprising at least one bearer aggregating selected transmission. The aggregation and selection depends on bearer type, user type, service type, etc.

Certain embodiments of the present invention seek to provide Multi-hop decapsulation for downlink in-band backhauling so as to decapsulate the above mentioned encapsulation techniques.

Certain embodiments of the present invention seek to provide a Dynamic bandwidth request for enlarging/reducing the uplink bandwidth allocation, based on suitable criteria such as but not limited to some or all of the following: number of served users, number of active/idle users, type of served users (e.g. simple, chief, relay, others), type of service/application (e.g. voice, video, other), and QOS.

Also provided is a computer program product, comprising a computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "operating", "processing", "computing", "selecting", "generating", or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

In accordance with an embodiment of the presently disclosed subject matter, there is presented a system comprising at least one mobile communicator having at least one allocation limitation, a base station operative to allocate bandwidth such that each such mobile communicator receives an allocation which takes into account the allocation limitation; and at least one relay served by the base station which is operative to logically combine limitations of mobile communicators served by the relay and to distribute an allocation between downlinks to the mobile communicators served by the relay, according to the limitations.

In accordance with an embodiment of the presently disclosed subject matter, there is further presented a system wherein the at least one relay is served by a base station and serves a plurality of descendant nodes including at least one of an additional relay and a mobile communication node, wherein the relay is operative to receive descendant bandwidth requests from the plurality of descendant nodes, to combine the descendant bandwidth requests into a single bandwidth request and to convey the single bandwidth request to the base station.

In accordance with an embodiment of the presently disclosed subject matter, there is still further presented a system wherein the at least one relay has descendants served thereby and is operative to logically combine needs of the descendants.

In accordance with an embodiment of the presently disclosed subject matter, there is still further presented a system, the at least one relay comprising a first relay connected to a base station via a chain of at least one uplink, the first relay serving a plurality of sons including at least one of another relay and a mobile communicator, the first relay being operative to allocate its uplink bandwidth between the sons by repeatedly receiving dynamic information regarding the available bandwidths of the uplinks in the chain and to compute its uplink bandwidth as the minimum of the available bandwidths.

In accordance with an embodiment of the presently disclosed subject matter, there is still further presented a system wherein the network comprises a hierarchical network.

In accordance with an embodiment of the presently disclosed subject matter, there is still further presented a system wherein the hierarchical network comprises a wireless hierarchical network.

In accordance with an embodiment of the presently disclosed subject matter, there is still further presented a system wherein the hierarchical network comprises an E-UTRAN network.

In accordance with an embodiment of the presently disclosed subject matter, connections are optionally at least one of: downlink only, uplink only, two-way (has both downlink and uplink).

Further in accordance with an embodiment of the presently disclosed subject matter, the hierarchical network comprises a network operable according to at least one of the following standards: 2G, 3G, LTE, WiFi, WiMax.

Also in accordance with an embodiment of the presently disclosed subject matter, there is provided base station apparatus comprising a base station serving nodes in an LTE communication network, the base station comprising external-to-the-base-station handover commanding functionality operative to issue a command for a handover from outside the base-station.

Additionally in accordance with an embodiment of the presently disclosed subject matter, there is provided a communication system comprising a hierarchical cellular network operable to manage quality-of-service (QOS) of at least one of its mobile stations.

Also in accordance with an embodiment of the presently disclosed subject matter, the network is operable to manage the QOS of at least one of the network's nodes.

Further in accordance with an embodiment of the presently disclosed subject matter, the network has at least one inter-node interface operable according to at least one of the following standards: GSM, 3G, LTE, WiFi, WiMAX.

Additionally in accordance with an embodiment of the presently disclosed subject matter, the QOS management is performed by using a QCI translation table.

Further in accordance with an embodiment of the presently disclosed subject matter, the QOS management is performed by chaining bearers.

Still further in accordance with an embodiment of the presently disclosed subject matter, the QOS management is performed by using distributed bearers chaining.

Yet further in accordance with an embodiment of the presently disclosed subject matter, the QOS management is performed by using centralistic bearers chaining.

Further in accordance with an embodiment of the presently disclosed subject matter, the network has a topology and wherein QOS management is performed by using initiated handovers to change the network topology.

Additionally in accordance with an embodiment of the presently disclosed subject matter, the QOS management is performed by using bandwidth-request messages.

Still further in accordance with an embodiment of the presently disclosed subject matter, the QOS management is performed by using a service management scheme.

Still further in accordance with an embodiment of the presently disclosed subject matter, the QOS management is performed by using a centralistic service management scheme.

Additionally in accordance with an embodiment of the presently disclosed subject matter, the QOS management is performed by using a distributed service management scheme.

Also provided, in accordance with an embodiment of the presently disclosed subject matter, is a communication system comprising a hierarchical cellular network having links and being operative to perform load-balancing of at least a subset of the links in the network.

Further in accordance with an embodiment of the presently disclosed subject matter, the load-balancing includes load-balancing of the number of users at at least a subset of the network's links.

Still further in accordance with an embodiment of the presently disclosed subject matter, the load-balancing includes load-balancing of the bandwidth allocation of at least a subset of the network's links.

Additionally provided, in accordance with an embodiment of the presently disclosed subject matter, is a computerized communications method comprising providing a hierarchical cellular network operable to manage quality-of-service (QOS) of at least one of its mobile stations.

Also provided, in accordance with an embodiment of the presently disclosed subject matter, is a computerized communications method comprising providing a hierarchical cellular network having links and being operative to perform load-balancing of at least a subset of the links in the network.

Further provided, in accordance with an embodiment of the presently disclosed subject matter, is a method which, in a mobile communication system including a network having at least one base station operative to receive information in resource allocation terminology understandable to the base station and to allocate downlink bandwidth accordingly, includes: using at least one relay: to convey to the base station information regarding needs of mobile communicators associated with the relay, using the resource allocation terminology understandable to the base station, and when receiving uplink bandwidth, from the base station, which generates an uplink between itself and the base station, to distribute the uplink bandwidth between the mobile communicators associated with the relay.

Further provided, in accordance with an embodiment of the presently disclosed subject matter, is a method which, in a mobile communication system including at least one mobile communicator having at least one allocation limitation and at least one base station operative to allocate bandwidth such that each such mobile communicator receives an allocation which takes into account the allocation limitation, the method of:

using at least one relay served by the base station to logically combine limitations of mobile communicators served by the relay and to distribute an allocation between downlinks to the mobile communicators served by the relay, according to the limitations.

Further provided, in accordance with an embodiment of the presently disclosed subject matter, is a method which, in a mobile communication system including at least one base station, the method of: using a first relay connected to the base station via a chain of at least one uplink: to serve a plurality of sons including at least one of another relay and a mobile communicator, the first relay being operative to allocate its uplink bandwidth between the sons by repeatedly receiving dynamic information regarding the available bandwidths of the uplinks in the chain; and to compute its uplink bandwidth as the minimum of the available bandwidths.

Further provided, in accordance with an embodiment of the presently disclosed subject matter, is a method which, in a mobile communication system including at least one base station, the method of: using at least one relay served by the base station and operative to serve a plurality of descendant nodes including at least one of an additional relay and a mobile communication node: to receive descendant bandwidth requests from the plurality of descendant nodes, to combine the descendant bandwidth requests into a single bandwidth request; and to convey the single bandwidth request to the base station.

BRIEF DESCRIPTION OF THE DRAWINGS

Prior art

Prior art

Prior art

Prior art FIGS. 4A-4B are simplified block diagram illustrations of a 2-tier hierarchical system e.g. as described in U.S. Pat. No. 5,729,826.

Prior art

Prior art

FIGS. 17a-17b, taken together, form a table of terms used herein.

DETAILED DESCRIPTION OF CERTAIN EMBODIMENTS

The terms used in the present specification, such as but not limited to the following terms, may be construed either in accordance with any definition thereof appearing in the prior art literature or in accordance with the specification or drawings, or as follows:

active link: If nodes are actually transferring data between them, the link between them is termed an "active link". In some technologies e.g. 4G, a link is sometimes established as an active link in advance i.e. before it is actually used to transfer data.

rUE: relay UE (relay User Equipment), is the backhauling link functionality of the relay implemented by mobile communicator. In the following description the backhauling link functionality is presented by way of example as rUE, but this is not intended to limit suitable implementations of the backhauling link functionality by another appropriate link or network.

backhauling bearer: a bearer which connects a relay UE to a network core. Typically operative to transfer backhauling data base station: The term "base station", which may be mobile or stationary, is intended to include, for example, a cellular base station such as but not limited to a 2G, 3G, 4G, or mobile Wimax cellular base station, as well as a wireless access point such as but not limited to a WiFi, Bluetooth or WiMax access point.

cellular: The term "cellular" is intended to include WiFi and other technologies which have a single cell i.e. access point. It is appreciated that access points may be interconnected outside the scope of the cellular network, e.g. via ADSL.

connected: Two network nodes are "connected" if they are capable of transferring data between them, e.g. over a wired or wireless link.

core: a switching functionality which activates connections between, ultimately, mobile communication devices. It is appreciated that the core may be co-located with a base station e.g. if the base station is an access point.

downlink: link from core toward mobile communication device i.e. a link in a sequence or route (also termed downlink sequence or down-route) of one or more links connecting the core to the device.

establish a link: activate a link i.e. cause a link to become active.

hierarchical network: a communication network wherein at least one mobile communication device is served by a first base station, also termed herein a "relay", which communicates with the core via a sequence of L>=1 linked base stations including: (a) optionally, L−1 base stations connected to one another hence also termed herein "relays", and (b) a second base station which is connected to the core.

radio interface: apparatus using radio technology to provide a link.

relay: see definition of "hierarchical network"

relay apparatus: synonymous to "relay"

served by: connected via an active link.

uplink: link from a mobile communication device toward the core i.e. a link in a sequence or route (also termed uplink sequence or up-route) of one or more links connecting the device to the core.

Figure 5:
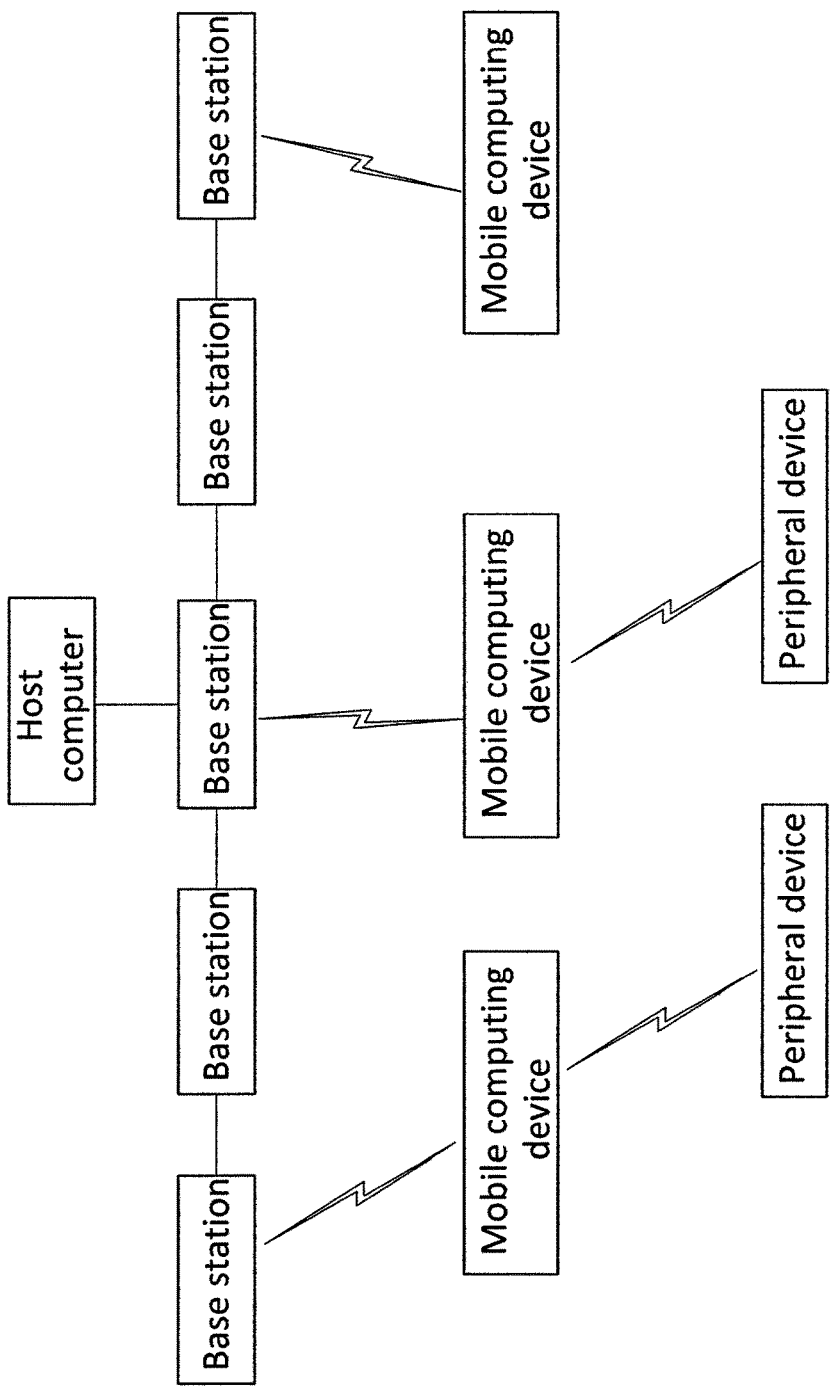
FIG. 5 is a simplified block diagram illustration of a 2-tier hierarchical LAN e.g. as described in U.S. Pat. No. 5,657,317.

The term "mobile computing device", e.g. in FIG. 5, is used herein to include any mobile communication device being a node in a communication network such as a cellular communication network, such as but not limited to a mobile telephone e.g. cellphone, smartphone, etc., as well as any computer that has a wireless modem such as a laptop with a LTE modem. It is appreciated that while many mobile communication devices have computing ability, the embodiments shown and described herein are applicable also to mobile communication devices which lack computing ability.

Generally, the term "relay" is used herein to refer to a mobile node in a cellular communication network whose node has both base station and mobile communicator functionalities and is operative to serve mobile communicators, such as cellular telephones, or other relays, and to be served by base stations or other relays. Typically, each relay communicates via antennae with the mobile communicators and includes a first radio manager, base station functionality which has a physical back-connection to the first radio manager, the first radio manager having a physical connection with the relay's mobile communicator functionality which in turn communicates via antennae with at least one selectable (static) base station. Typically, the first radio manager comprises a radio resource manager and functionality for receiving information from, and sending information to, other radio managers, respectively co-located with other relays, and for using the information to determine whether to reject at least one mobile communicator seeking to be served by an individual base station associated with the individual co-located radio manager.

A particular problem characterizing mobile communication systems in which some mobile communicators communicate indirectly with the base stations, is thin-ness of the uplinks connecting the mobile communicators with the base stations. Certain embodiments of the present invention are helpful in overcoming this problem.

Mobile communication systems in which some mobile communicators are beyond-range of, hence communicate indirectly with, the base stations, typically include a core associated with base stations, mobile communicators which may or may not be within range of the base stations, and communication relaying mobile stations which have some or all of the functionalities of both base stations and mobile communicators. An example of a mobile communication system in which some mobile communicators communicate indirectly with the base stations is described herein in co-pending Published PCT Patent Application WO/2011/092698, entitled "Cellular Communication System With Moving Base Stations And Methods And Apparatus Useful In Conjunction Therewith".

When single-hop communication is used, a communication relaying mobile station is within the range of a base station and has a mobile communicator within its own range. When multi-hop communication is used, a chain of n>=2 communication relaying mobile stations are provided, the first of which, 1, is within the range of a base station, the last of which, n, has a mobile communicator within its own range, and each adjacent pair I, i+1 of which, for I=1, . . . n−1, is characterized in that the (i+1)'th communication relaying mobile station is within the range of the I'th communication relaying mobile station.

A mobile communication system may be provided including at least one base station operative to receive information in resource allocation terminology understandable to the base station and to allocate downlink bandwidth accordingly, the system comprising at least one relay which conveys to the base station, information regarding needs of mobile communicators associated with the relay, using the resource allocation terminology understandable to the base station, and wherein the relay, when receiving unlink bandwidth from the base station generating an uplink between itself and the base station, distributes the uplink bandwidth between the mobile communicators associated with the relay.

Optionally, the resource allocation terminology comprises bearer terminology defined by a cellular telephone protocol to characterize a communication channel.

Optionally, the protocol comprises an LTE protocol.

Optionally, the protocol comprises a Wimax protocol.

Optionally, the information comprises quality of service information characterizing service to be provided to the mobile communicators and wherein distribution of the uplink bandwidth between the mobile communicators associated with the relay is prioritized based on relative quality of service to be provided to the mobile communicators.

Optionally, the system comprises a core operative to determine a distribution scheme according to which the uplink bandwidth is distributed between the mobile communicators associated with the relay.

According to certain embodiments, load manager functionality is provided, which sees that many mobile communicators are being served by one relay selected by the mobile communicator s because that relay is the best service provider, e.g. in terms of quality of reception, in their area, but another relay is in their area which can also provide adequate quality of reception. The load manager is typically operative to command only some of the mobile communicators served by a particular relay to transfer to another relay whereas other mobile communicator s may be commanded to stay with that relay or to transfer to still another relay. Typically, the load manager stores mobile communication topology including the mobile communicators served by each relay. Using, e.g., conventional mobile communication standards such as but not limited to LTE or Wimax, each relay provides the load manager with an indication of the reception quality it obtains from each of the base stations in its vicinity, either of its own accord or responsive to a command from the load manager. A suitable measure of quality of reception is SNR, for example. This allows the load manager to detect, say, a geographical cluster of mobile communicators all receiving service from a single relay, and to transfer some of the mobile communicators in the cluster to one or more alternative relays which provide somewhat worse but still adequate SNR.

More generally, the system may also comprise a load manager functionality which commands mobile communicators to transfer from one relay to another based on relative loads on the relays.

A base station may serve a mobile communicator or mobile communicators which have at least one allocation limitation. The limitation may be regarding minimal bandwidth, below which any bandwidth allocated is not useful. Or the limitation may be regarding a quantization of bandwidth, such that bandwidth values other than certain discrete values are only utilized at the level of the discrete value below the actual supplied value. Or the limitation may be regarding minimal error rate such that bandwidth suffering from an error rate greater than the minimal error rate cannot be used by the mobile communicator. Or the limitation may be regarding the type of user manning the mobile communicator (senior vs. junior, etc.). Typically, the base station knows to allocate bandwidth such that each such mobile communicator receives an allocation which can be utilized fully or as fully as possible, despite the mobile communicator's limitations.

A mobile communication system may be provided, comprising at least one mobile communicator having at least one allocation limitation; a base station operative to allocate bandwidth such that each such mobile communicator receives an allocation which takes into account the allocation limitation; and at least one relay served by the base station which is operative to logically combine limitations of mobile communicators served by the relay and to distribute an allocation between downlinks to the mobile communicators served by the relay, according to the limitations.

Optionally, at least one limitation pertains to minimal bandwidth, below which any bandwidth allocated is not useful to the mobile communicator.

Optionally, at least one limitation pertains to quantization of bandwidth, such that bandwidth values other than certain discrete values are only utilized by the mobile communicator at the level of the discrete value below the actual supplied value.

Optionally, at least one limitation pertains to minimal error rate such that bandwidth suffering from an error rate greater than the minimal error rate cannot be used by the mobile communicator.

Optionally, at least one limitation pertains to type of user manning the mobile communicator.

Optionally, the limitation ascribes greater importance to voice than to data.

A mobile communication system may be provided, comprising:

A first relay connected to a base station via a chain of at least one uplink, the first relay serving a plurality of sons including at least one of another relay and a mobile communicator, the first relay being operative to allocate its uplink bandwidth between the sons by repeatedly receiving dynamic information regarding the available bandwidths of the uplinks in the chain and to compute its uplink bandwidth as the minimum of the available bandwidths.

A mobile communication system may be provided, including at least one base station; the system comprising at least one relay served by a base station and serving a plurality of descendant nodes including at least one of an additional relay and a mobile communication node, wherein the relay is operative to receive descendant bandwidth requests from the plurality of descendant nodes, to combine the descendant bandwidth requests into a single bandwidth request and to convey the single bandwidth request to the base station.

Optionally, the relay combines the descendant bandwidth requests into a single bandwidth request so as to take into account which type of user generated each descendant bandwidth request.

Optionally, the relay combines the descendant bandwidth requests into a single bandwidth request so as to take into account which type of application characterizes the user which generated each descendant bandwidth request.

Example embodiments of the above systems are now described with reference to FIGS. 7-16.

Figure 7:
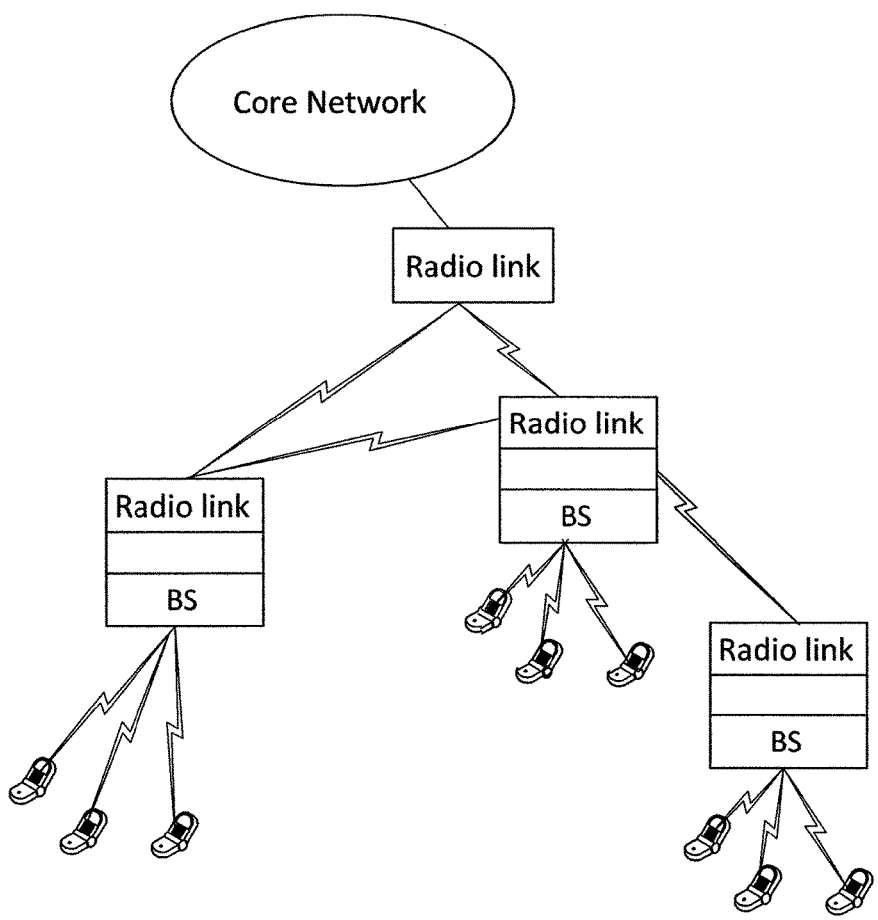
FIG. 7 is a semi-pictorial diagram of an N-tier hierarchical radio-link cellular system network constructed and operative in accordance with certain embodiments of the present invention, where N may be more than 2.

A hierarchical mobile system useful in conjunction with certain embodiments of the present invention is known in the art, e.g. as shown in U.S. Pat. Nos. 5,729,826 and 5,657,317 and in co-pending Published PCT Patent Application WO/2011/092698, entitled "Cellular Communication System With Moving Base Stations And Methods And Apparatus Useful In Conjunction Therewith". A particularly suitable hierarchical radio-link network, for implementing certain embodiments of the invention shown and described herein, is illustrated in FIG. 7.

U.S. Pat. No. 5,729,826, describes a 2-tier hierarchical cellular network, where the RAs move with traffic and communicate with the core via fixed radio ports. The RAs are provided with a high gain directional antenna. An example of a suitable network of this type is illustrated in prior art FIGS. 4A-4B. A moving base station may have an RH added to the processor block.

U.S. Pat. No. 5,657,317 describes a 2-tier hierarchical LAN. The first tier may comprise a hard wired LAN comprising radio base stations. The second tier may include a variety of roaming computer devices such as vehicle terminals and computer terminals to peripheral devices that can bind to the mobile computing device and communicate with different devices on the LAN. An example of a suitable network of this type is illustrated in prior art FIGS. 4A-4B.

Figure 6A:
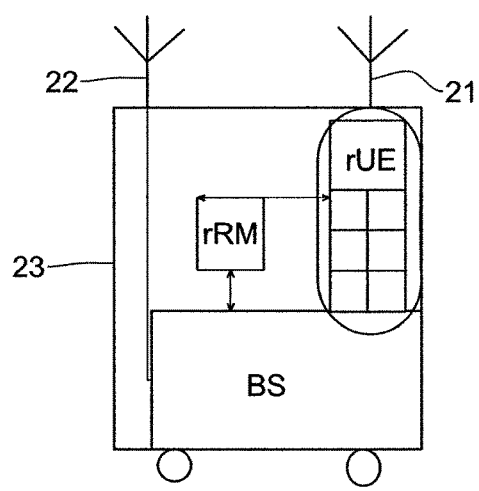
FIGS. 6A-6B are semi-pictorial diagrams of an n-tier hierarchical in-band multi-hop cellular network, using a mobile communication device as a backhauling device.
Figure 6B:
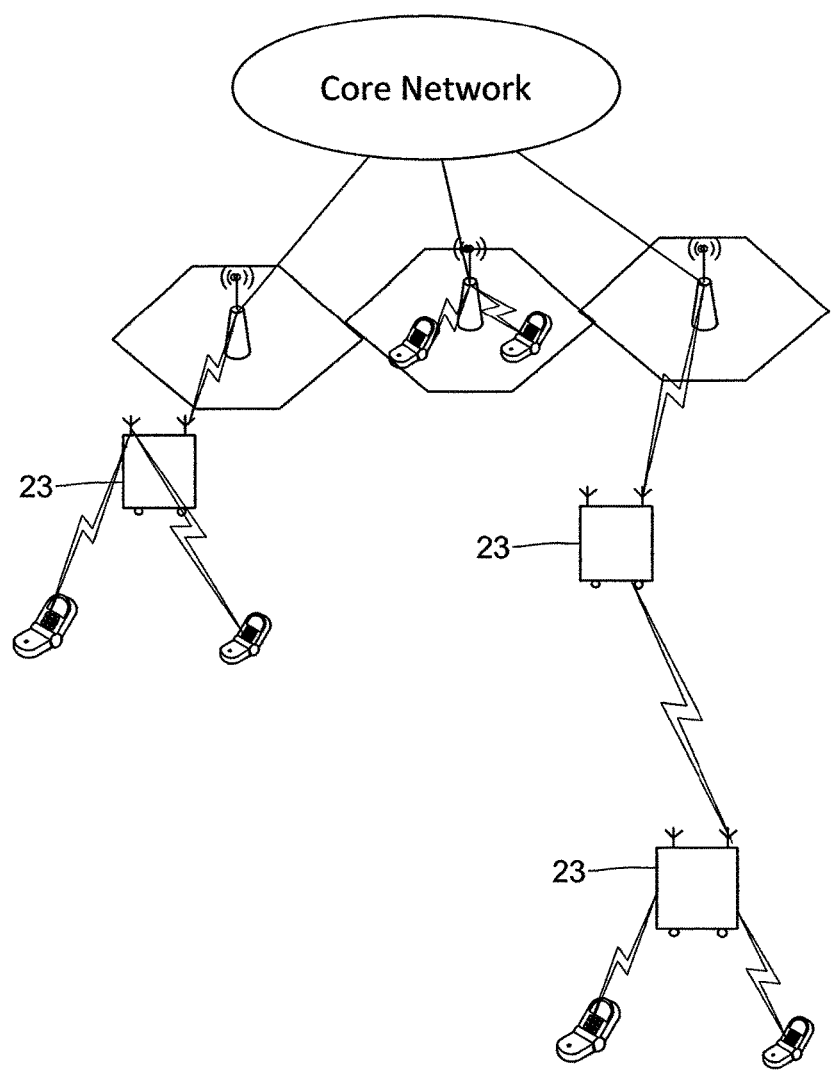

The above-mentioned co-pending Israel Patent Application No. 206455 illustrates an n-tier hierarchical in-band multi-hop cellular network using a mobile communication device 23, which may include antennae 21, 22 as shown, as a backhauling device as illustrated in FIGS. 6a-6b. The RH may be added to the rRM block.

An N-tier hierarchical radio-link network, as depicted in FIG. 7, uses radio interface for backhauling, giving higher uplink BW capacity and better range cover.

A dynamic hierarchical cellular system, e.g. as in FIG. 7, typically has some or all of the following capabilities which are typically not applicable in a conventional cellular system:

a. Finding the route to mobile communication device through several hops. Due to the dynamics of the system, when a message is being routed from source to destination, there is uncertainty in the position of the destination when the message arrives; moreover, there is uncertainty in the correctness of the routing route because several nodes along the route may change their position.

b. Traffic 'bottlenecks' occur at a certain point along the backhauling route. A typical cellular system does not consider bottlenecks along the backhauling route. In a hierarchical cellular system, because of limitations in the backhauling BW, bottlenecks might occur. For example, consider that several distant users are using a relay apparatus (RA) that is connected to another relay apparatus (RA) that might be almost overloaded due to other distant users. The result of these bottlenecks is low utilization of the radio channels and an unsatisfying user experience.

c. Using a dynamic hierarchical cellular system adds two variables to the routing graph, number of hops and link quality. These two variables change rapidly, due to the dynamics of the system, and affect the utilization of the system. Hops increase delay, and link quality affects the backhauling BW.

d. Service management through several hops. Different services have different requirements; for example, services such as voice calls are not tolerated to latency, but require little BW; services like web browsing are tolerated to latency but are high BW consumers. In order to be able to support these kinds of services, different service requirements and their mutual effect on each other are taken into account. In some cases, interfaces might interfere with each other, for example when they share the same limited resource, such as uplink BW on a specific route. In such cases, the more important service request is typically given advantage.

e. Scheduling of the different services. Different services have different characteristics. Some use a constant bit rate and are not tolerated to delays, such as voice calls, and others are tolerated to delays, but are very 'greedy' in their BW consumption, and work in bursts. Once the services have been established, a special scheduler, which resides in the relay apparatus (RA), may schedule their requests according to their service requirements. Moreover, different priorities may be assigned to different service requests. In such cases, the more important request should have advantage in the resource scheduler.

f. Handover management in case of a backhauling link failure Specifically:

Certain embodiments of the present invention seek to provide a way to optimize the bottleneck problem through analysis of the topology graph, and to balance it through handover.

Certain embodiments of the present invention seek to provide a way to give BW allocation according to the service precedent.

Certain embodiments of the present invention seek to provide a way to give BW allocation according to the user precedent.

Certain embodiments of the present invention seek to provide a way to give BW allocation according to the destination precedent.

Certain embodiments of the present invention seek to provide a way to find the route to the mobile communication device using a central application server that resides in the core.

Certain embodiments of the present invention seek to provide a way to find the route to the mobile communication device using an autonomic distributed application that resides in the relay apparatus (RA).

Certain embodiments of the present invention seek to provide a way to increase uplink BW capacity by using handover.

Certain embodiments of the present invention seek to provide a way to increase BW capacity by using a number of backhauling radio links.

Certain embodiments of the present invention seek to provide a way to increase BW expectancy by using requests to enlarge\reduce BW that considers different service requirements along the route.

Certain embodiments of the present invention seek to provide a way to increase BW expectancy by using requests to enlarge\reduce BW that considers different users' precedents along the route.

Certain embodiments of the present invention seek to provide a way to increase BW expectancy by segmenting the available BW while considering different service requirements along the route.

Certain embodiments of the present invention seek to provide a way to increase network reliability by using handover.

Load balancing management using topology graph in the RS, according to certain embodiments, is now described.

Figure 8:
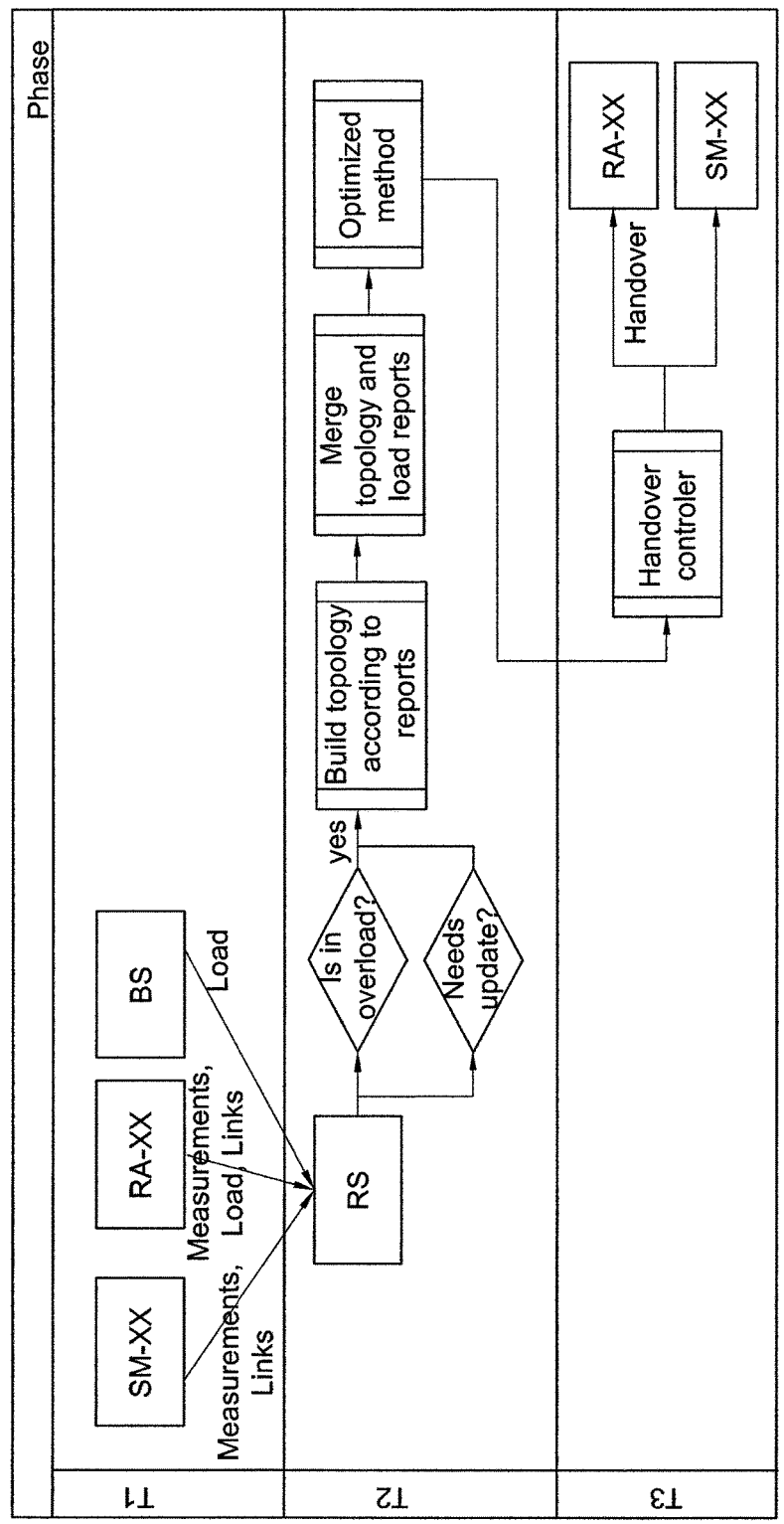
FIG. 8 is a simplified flowchart illustration of a centralistic load balancing method in a hierarchical cellular network system, operative in accordance with certain embodiments of the present invention.

FIG. 8 is a flow chart illustrating the load balancing procedure, typically including some or all of the following 3 stages, suitably ordered e.g. as follows:

T1: Load reports, measurement and potential links flow through the active route to the RS.

T2: In case of an overload indication, and/or in a periodic procedure, RS uses the measurement and the links in order to build a map e.g. topology graph. The load and measurement reports are combined and merged with the topology graph, yielding a flow graph. The flow graph is processed by an optimization method indicating the handovers, both from end units and from relay, that may be employed in order to fix the overload.

T3: Handover controller coordinates the handovers of the different RAs and SMs.

The optimization method may for example balance the number of users in each branch, e.g. as described below with reference to FIG. 9, and/or the summary of priority of each user in each branch, BW allocation and service allocation.

Figure 9:
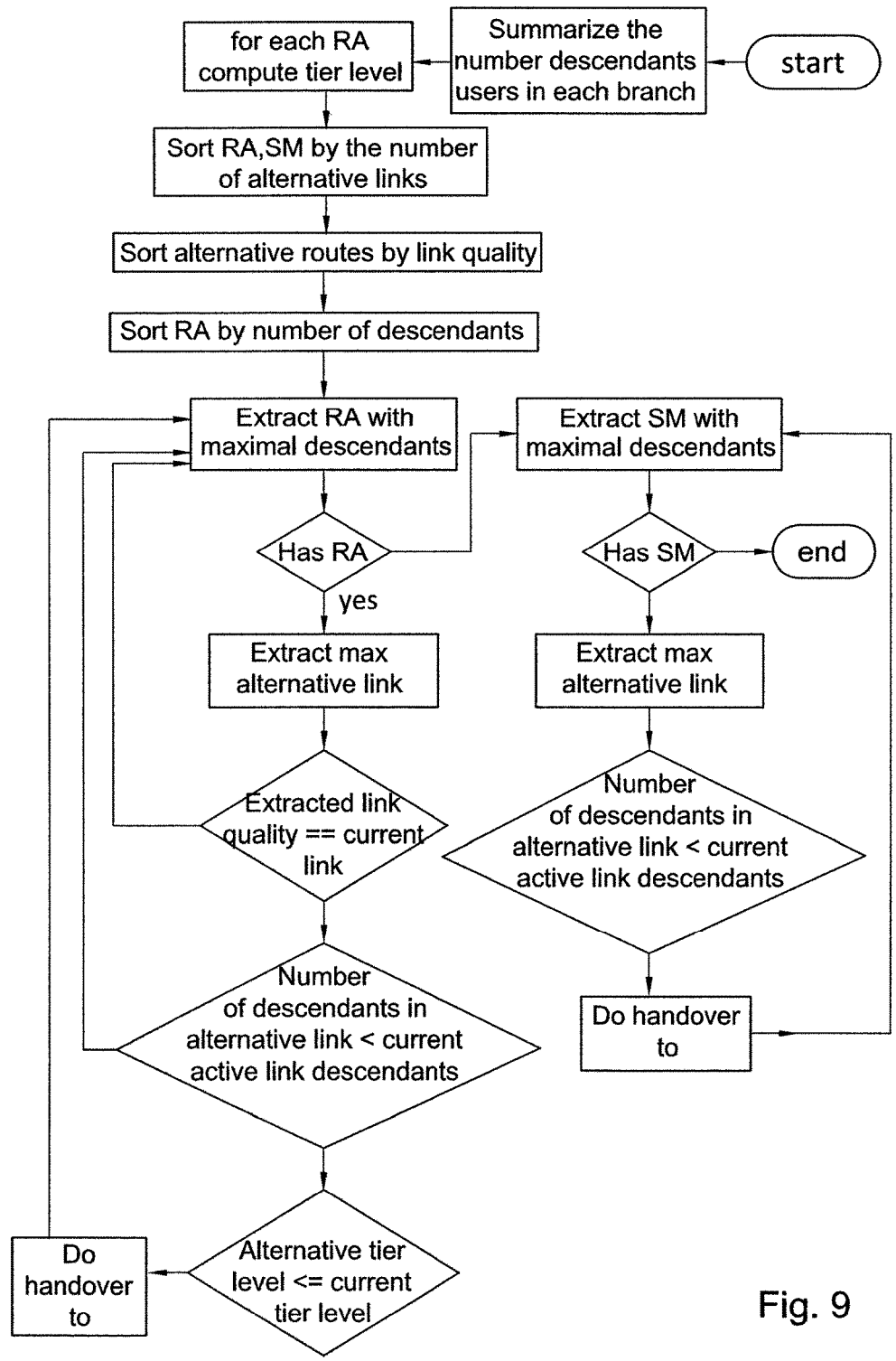
FIG. 9 is a simplified flowchart illustration of a load balancing method, balancing the number of users in each branch for a multi-hop hierarchical cellular network system, operative in accordance with certain embodiments of the present invention.

FIG. 9 depicts a load balancing method balancing the number of users in each branch for a multi-hop hierarchical cellular network system.

Figure 10:
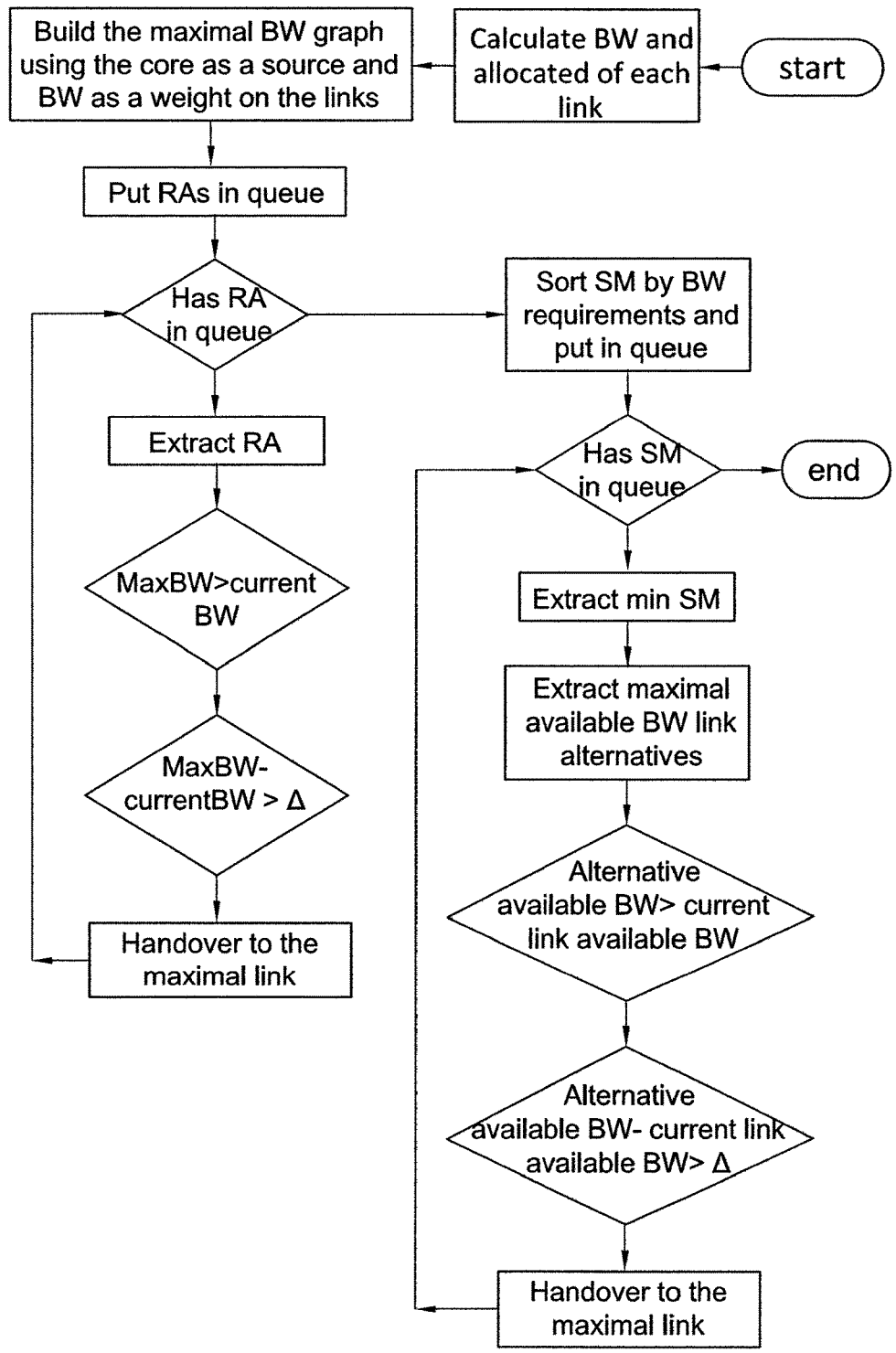
FIG. 10 is a simplified flowchart illustration of a load balancing method, balancing BW allocation for a multi-hop hierarchical cellular network system, operative in accordance with certain embodiments of the present invention.

FIG. 10 depicts a load balancing method balancing BW allocation for a multi-hop hierarchical cellular network system.

Figure 11A:
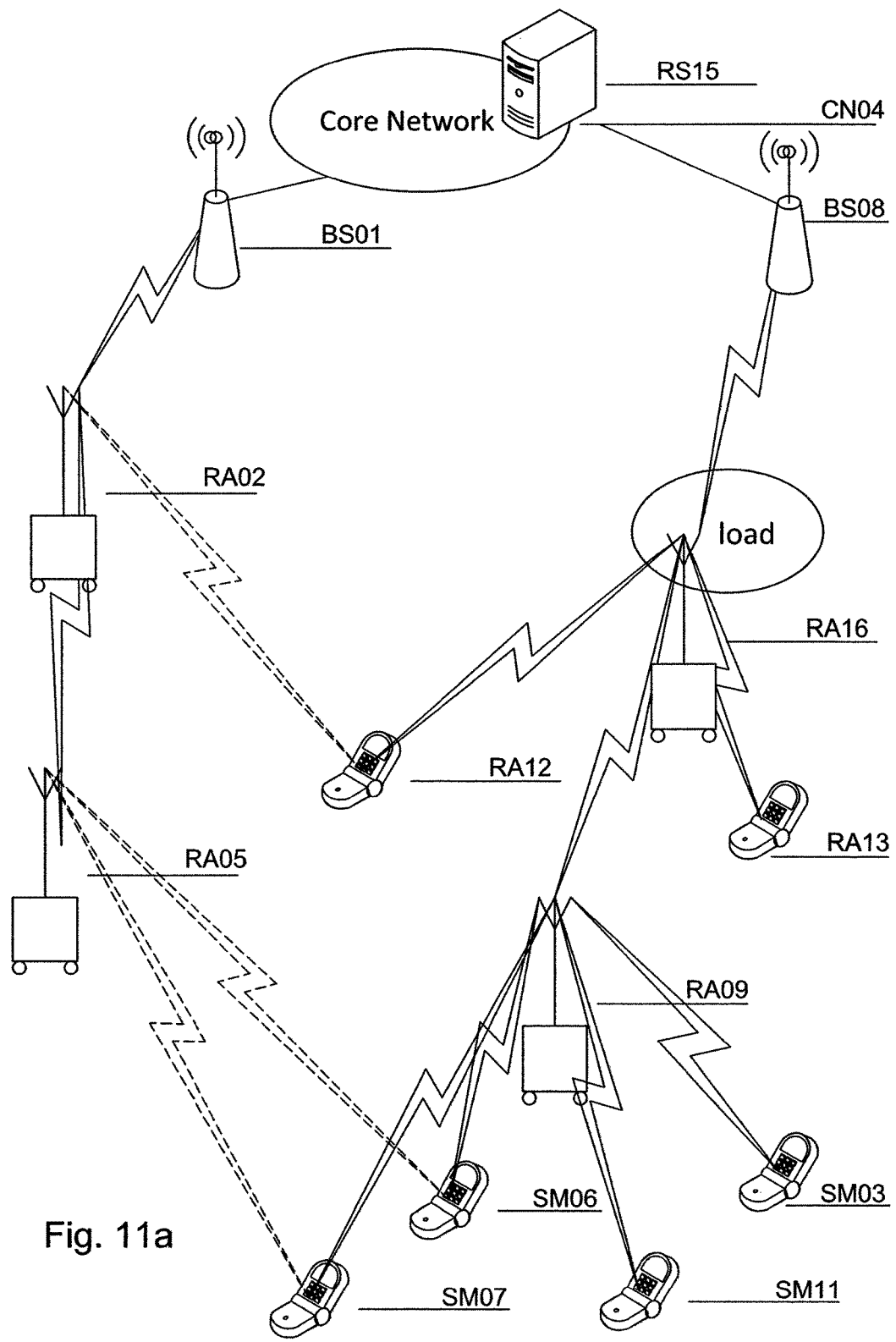
FIGS. 11A-11B, 12A-12B together form a series of semi-pictorial diagrams of system topology, before and after application of the load balancing method, all constructed and operative in accordance with certain embodiments of the present invention.

FIG. 11a represents the situation before the load balancing procedure.

SM03 and SM11 are actively linked to RA09. SM13 is actively linked to RA16. SM07 and SM06 are linked to RA05 and actively linked to RA09. RA12 is linked to RA02 and actively linked to RA16. RA05 is actively linked to RA02 and RA09 is actively linked to RA16. RA02 is actively linked to BS01 and RA16 is actively linked to BS08.

RA16 indicates an overload.

RS builds the topology graph and runs the optimization method.

Figure 11B:
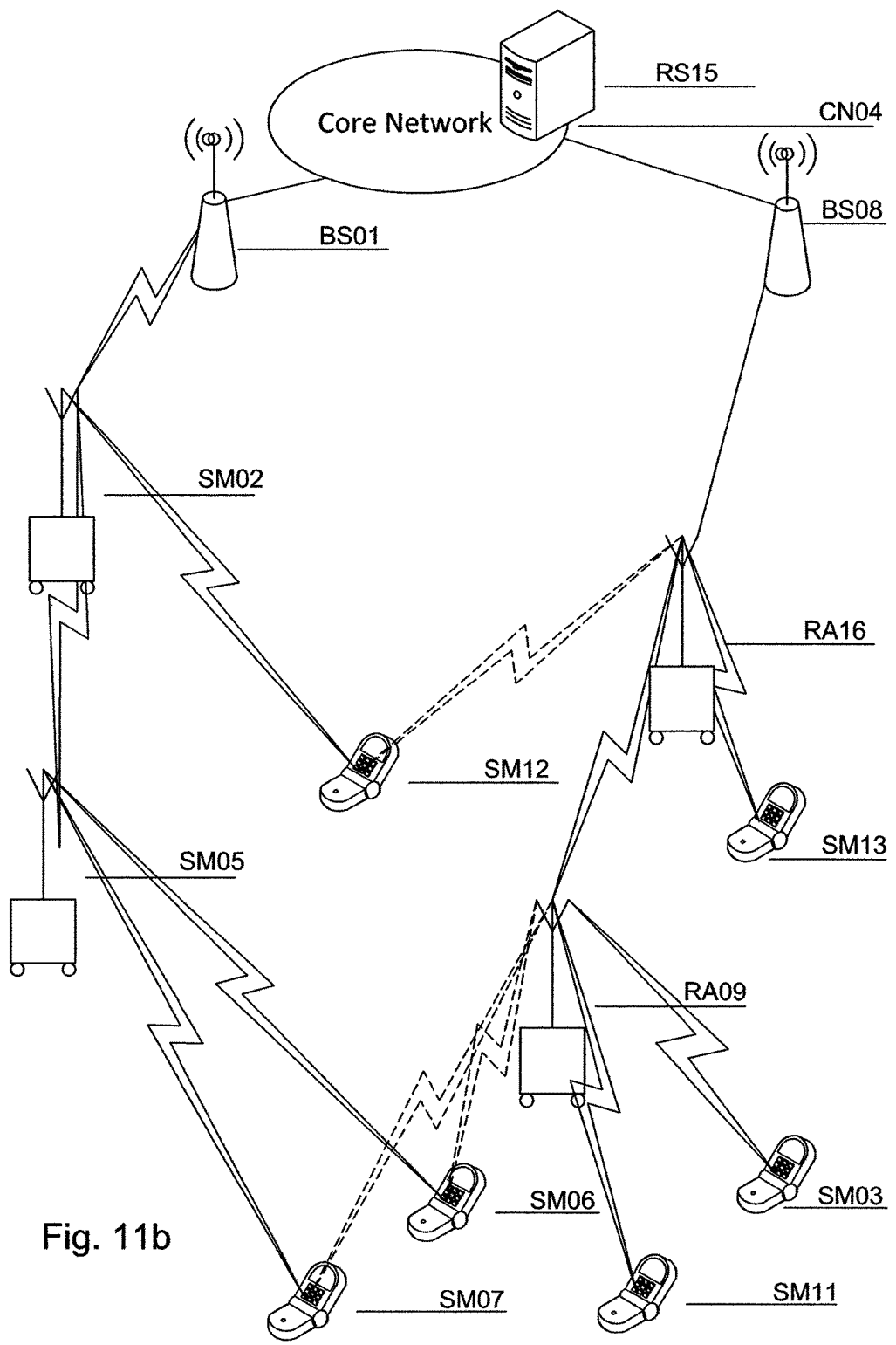

FIG. 11b depicts the topology after the optimization method.

SM12 is actively linked to RA02, SM07 and SM06 is actively linked to RA05.

Figure 12A:
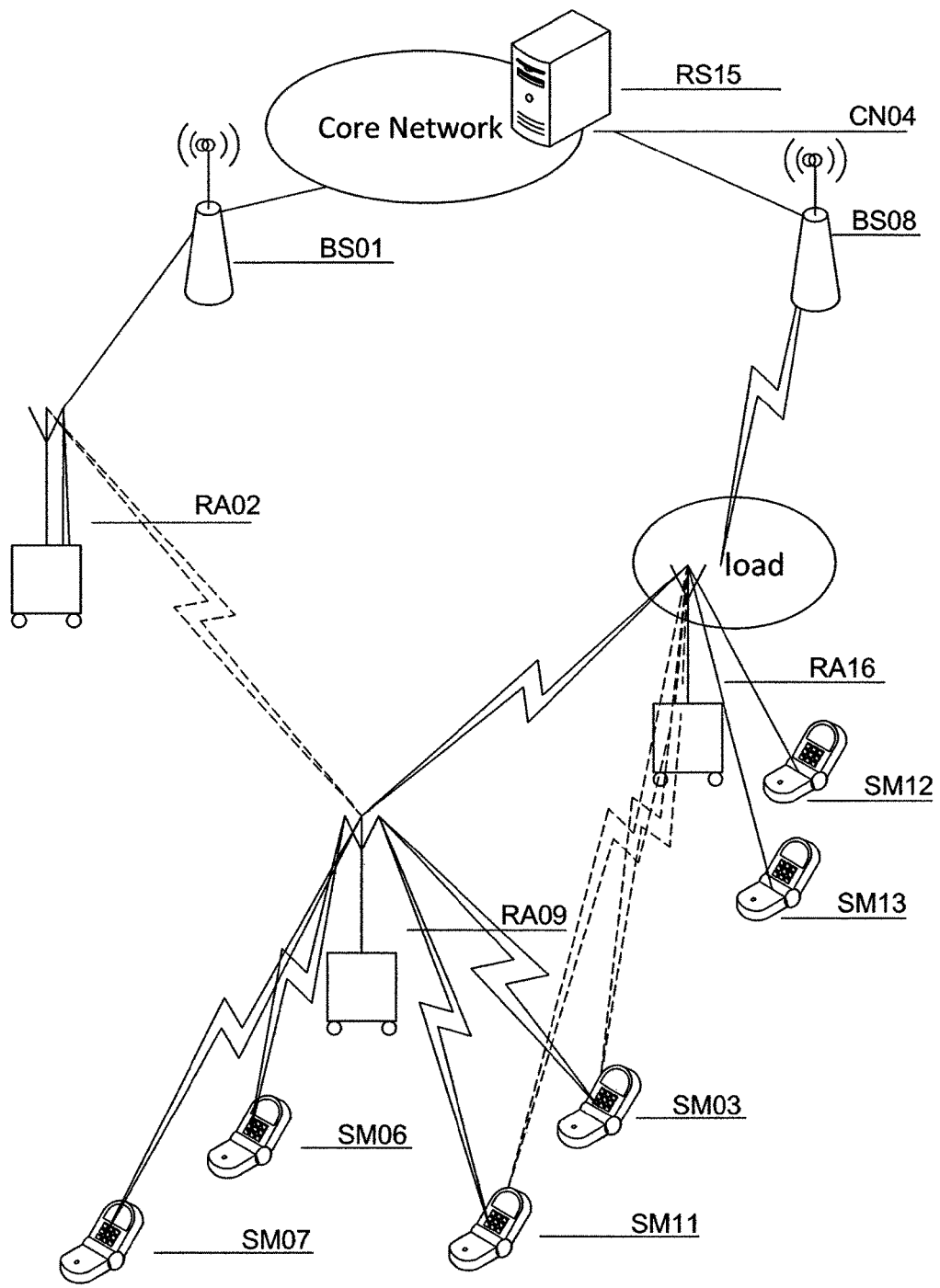

FIG. 12a represents a load problem in RA16.

Figure 12B:
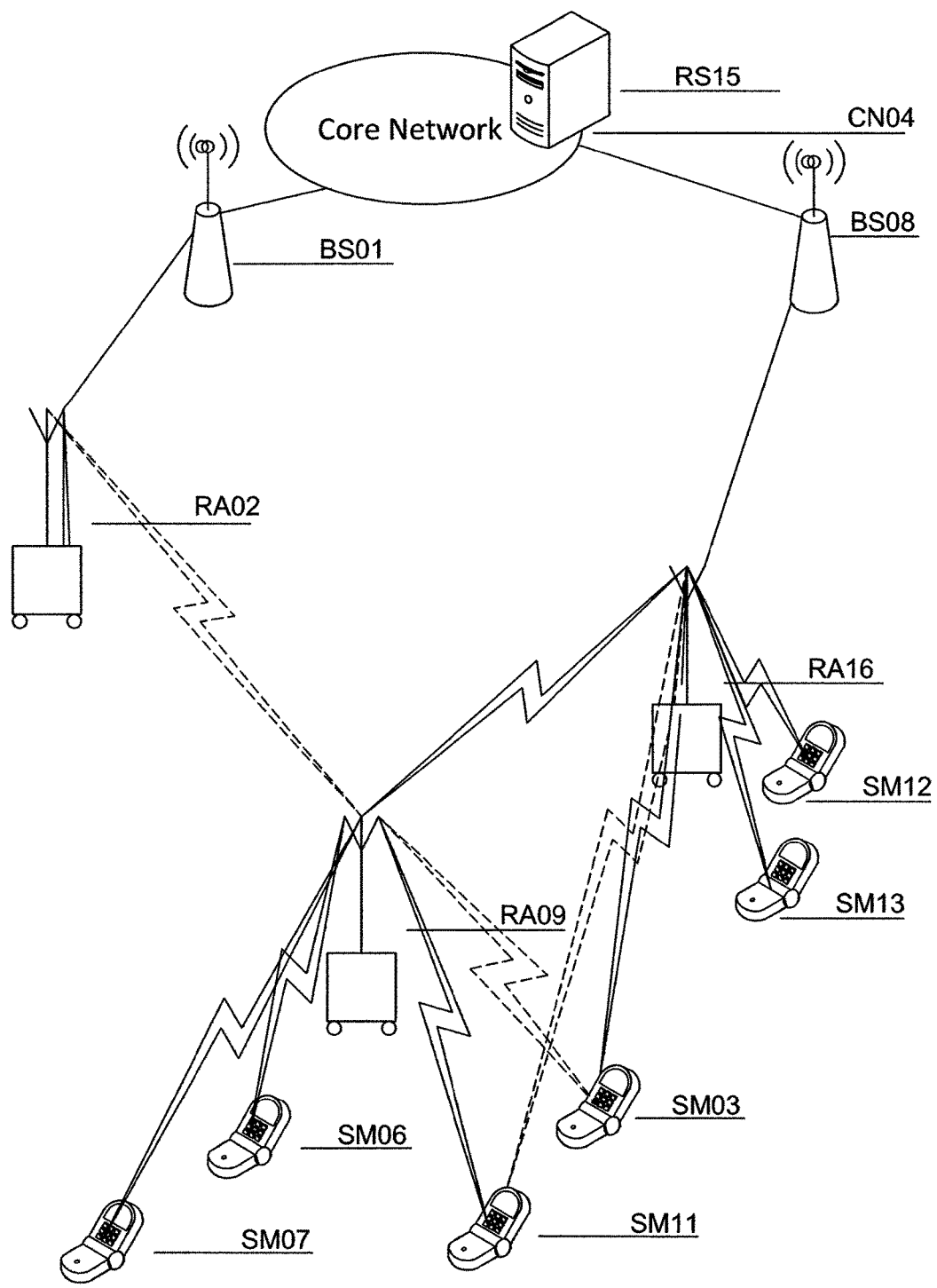

FIG. 12b shows the topology after the optimization method. RA09 is actively linked to RA02 and SM03 is actively linked to RA16.

According to certain embodiments, a dynamic bandwidth request is generated for enlarging/reducing the uplink bandwidth allocation, which may be based on suitable criteria, e.g. one or more of the following: number of served users, number of active/idle users, type of served users (such as but not limited to simple, chief, relay), type of service/application (such as but not limited to voice, video, game, data); QOS.

In another embodiment of the present invention, at least one, and typically each individual relay apparatus (RA) continuously monitors and computes the bandwidth it needs in its uplink. This "needed" bandwidth typically comprises the aggregated needed uplink throughput of the units the individual relay apparatus (RA) in question is serving. Some of these units may be mobile communication device units whereas others may be relay apparatus (RA) units below the individual relay apparatus (RA) in the hierarchy defined by the topology. For example, in FIG. 12A, RA16 may monitor the uplink needs of SM12, SM13 and of RA09. The aggregated uplink needs are then requested from the serving station of the relay apparatus (RA) which may be a base station (BS), or another relay apparatus (RA). For example, in FIG. 12A, RA16 may request its needed uplink bandwidth from BS08, while RA09 requests its needed bandwidth from RA16.

Such requests may be effected using standard protocol messages, existing in conventional cellular protocols, such as but not limited to WiMAX and LTE. These bandwidth request messages are usually part of the MAC protocol layer of the cellular communication standard.

Optionally, each relay apparatus (RA) may monitor, compute and send its aggregated request periodically. Alternatively, relay apparatus (RA) may compute and send its request as triggered by a predetermined type of event, such as but not limited to the entry or exit of an mobile communication device or relay apparatus (RA) to be served, mobile communication device going into idle mode or power-save mode, and mobile communication device waking from power-save mode.

Optionally, the relay apparatus (RA) computes its request based on suitable criteria, e.g. taking into account at least one of the following considerations:

1. Number of served users or units
2. Number of active/idle users or units
3. Type of served users (e.g. simple user, priority user, relay apparatus (RA))
4. Type of service/application (e.g. voice, video, game, data)
5. QOS needs of the served units
6. Known limitations, such as maximal allowed uplink request. Such a limitation may optionally be configured in advance. Alternatively, such a limitation may be reported to the relay apparatus (RA) by its serving base station (BS) or serving relay apparatus (RA).

Figure 13:
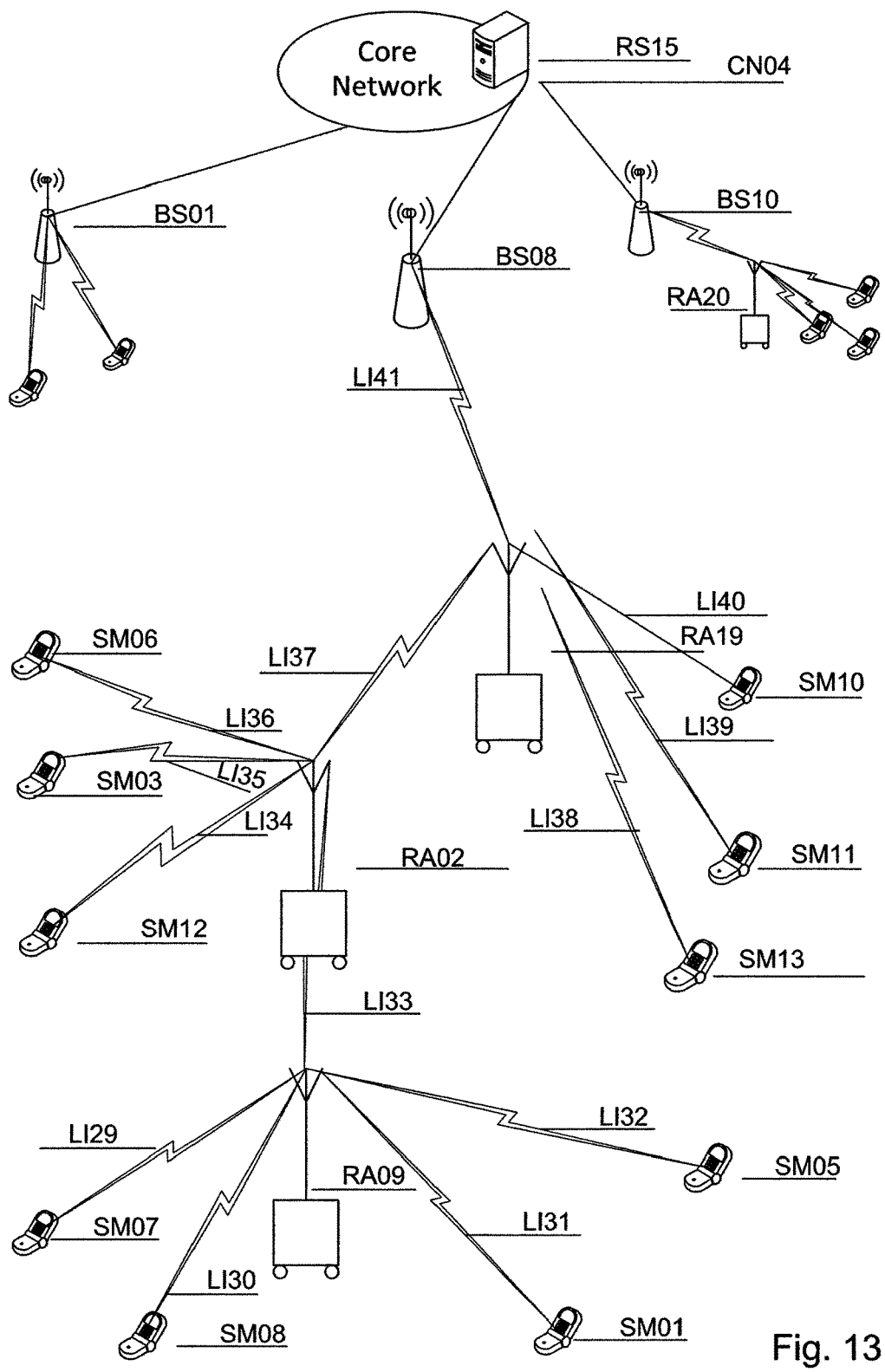
FIG. 13 is a semi-pictorial diagram of an example centralistic service management scheme, constructed and operative in accordance with certain embodiments of the present invention.
Figure 14:
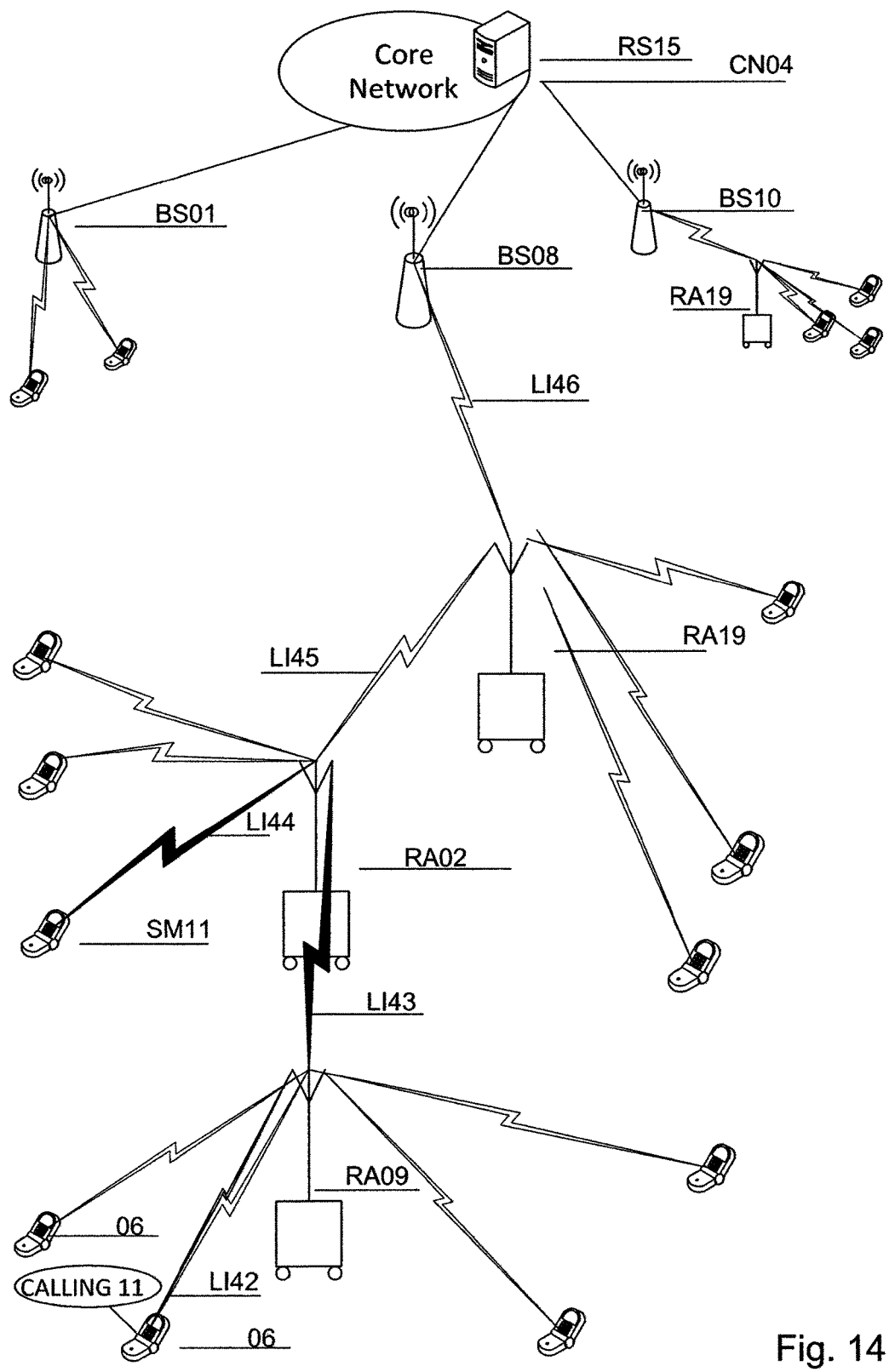
FIG. 14 is a semi-pictorial diagram of a voice call service setup, constructed and operative in accordance with certain embodiments of the present invention.
Figure 15:
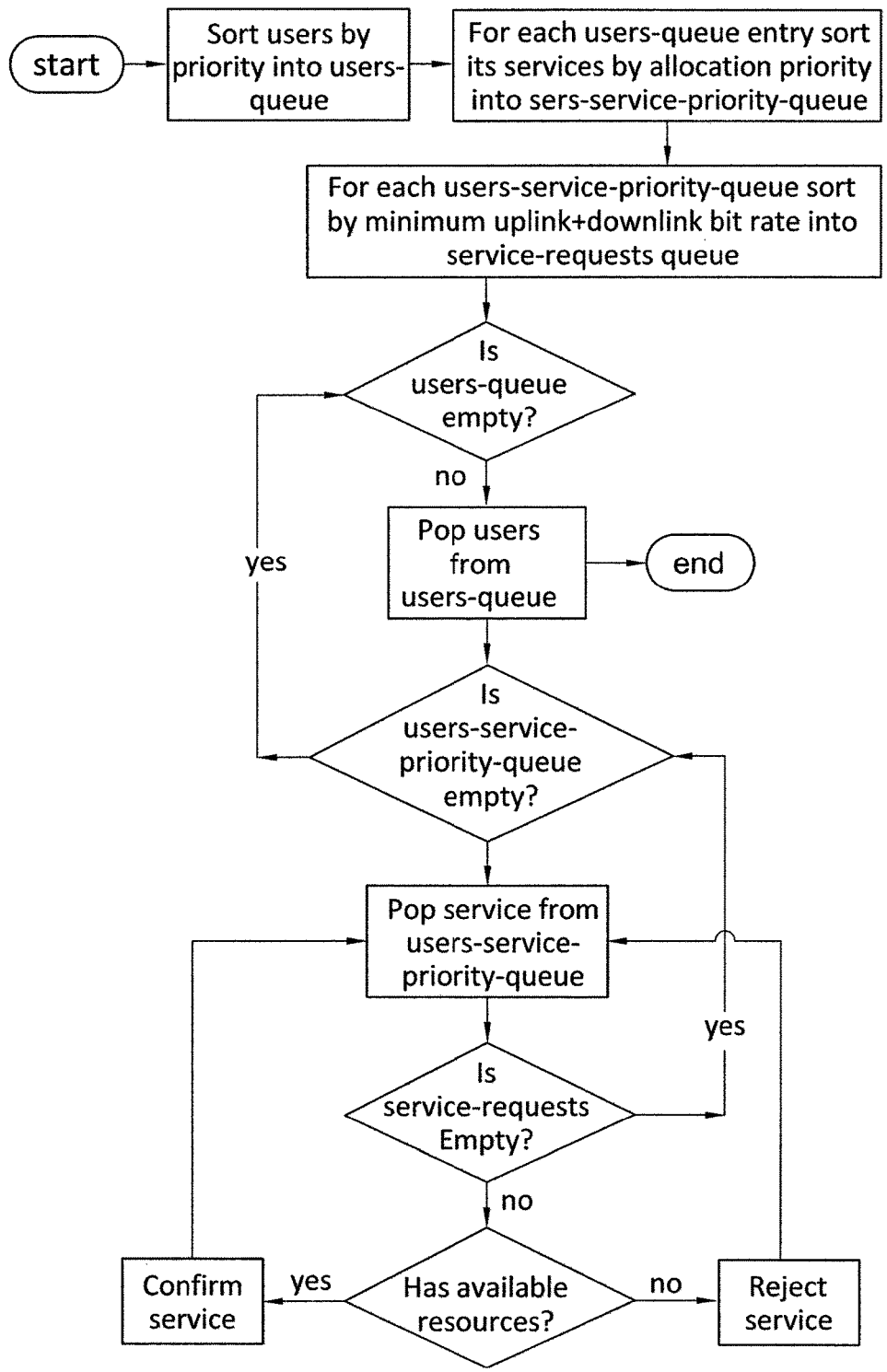
FIG. 15 is a simplified flowchart illustration of a service allocation method, based on allocation priority, operative in accordance with certain embodiments of the present invention.

Examples of operation of a hierarchical central service management scheme, according to certain embodiments of the present invention, are depicted in FIG. 13 and in FIG. 14. In FIG. 13, links LI29-LI41 pass up and down information on requests for establishment of services (e.g. for bearers) which are either confirmed or rejected.

In the illustrated embodiments, 10 such requests are made. In particular, the links may be used to pass on the following messages 1-28, which may be assumed for simplicity to be sequential although in practice, of course, this need not be the case:

LI29
1: service1 establishment
28: service1 confirm\reject
LI30
2: service2 establishment
27: service2 confirm\reject
LI31
3: service3 establishment
26: service3 confirm\reject
LI32
4: service4 establishment
25: service4 confirm\reject
LI33
5: service1-4 establishment
24: service1-4 confirm and reject list
LI34
8: service7 establishment
23: service7 confirm\reject
LI35
7: service6 establishment
22: service6 confirm\reject
LI36
6: service5 establishment
21: service5 confirm\reject
LI37
9: service1-7 establishment
20: service 1-7 confirm and reject list
LI38
12: service10 establishment
19: service10 confirm\reject
LI39
11: service9 establishment
18: service9 confirm\reject
LI40:
10: service8 establishment
17: service8 confirm\reject
LI41
13: service1-10 establishment
16: service confirm and reject list
BS08 then sends the following respectively up to and down from the core:
14: service1-10 establishment
15: service confirm and reject list In FIG. 14, links LI42-LI46 pass up information on a request for establishment of a service e.g. bearer for a voice call; this request is confirmed and passed back down to the caller SM06, who can then call the callee SM11.

LI42
1: voice call to SM11 service request
10: voice call to SM11 service setup
LI43
2: voice call to SM11 service request
9: voice call to SM11 service setup
LI44
9: voice call to SM11 service setup
LI45
3: voice call to SM11 service request
8: voice call SM06<->SM11 service accept
LI46
4: voice call to SM11 service request
7: voice call SM06<->SM11 service accept
BS08 then sends the following respectively up to and down from the core:
5: voice call to SM11 service request
6: voice call SM06<->SM11 service accept Various SMs' bw and service requirements are signaled, using a service establish message.

A service establishment message may include some or all of the following:

1. Minimum uplink bit rate
2. Minimum downlink bit rate
3. Maximum uplink bit rate 4. Maximum downlink bit rate
5. User priority
6. Allocation priority
7. Service indication (voice call, data web, video)
8. Maximum delay
9. Maximum error rate
10. Destination ID (MSISDN, Mac-address, IP-address)

The service requests are aggregated and forwarded to the RS through different higher RAs.

The resource allocation management mechanism, which resides in the RS, gets all requirements and affiliates it with the current BW allocation topology graph. The resource allocation management mechanism may confirm or reject service requests, according to the available resources and the different priorities and requirements of all services in the system. It may also order to change or close already established services.

When a service gets accepted by the RS, RS sends a service setup message to the relevant nodes along the route, as depicted in FIG. 14. Every service setup indicates the different resource requirements of data that is mapped to the specific service, such as scheduling policy, queue management policy, rate policy and more.

FIG. 14 depicts a call service setup between SM12 and SM06. The request is sent to the RS, gets accepted and then a service setup procedure allocates the required resources along the route between SM11 and SM06 through RA09 and RA02.

Figure 1:
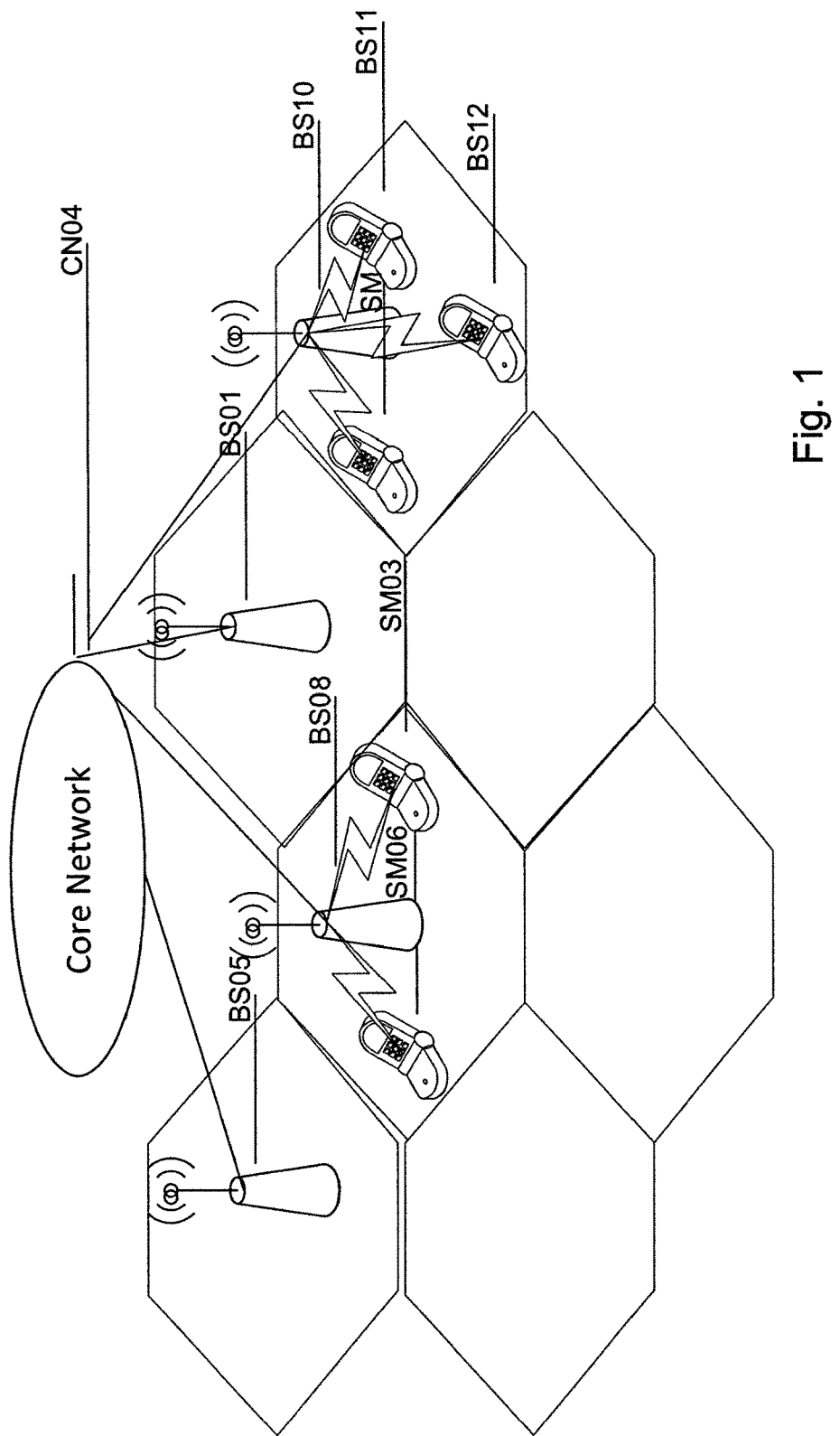
FIG. 1 is a semi-pictorial diagram of a conventional cellular system.
Figure 2:
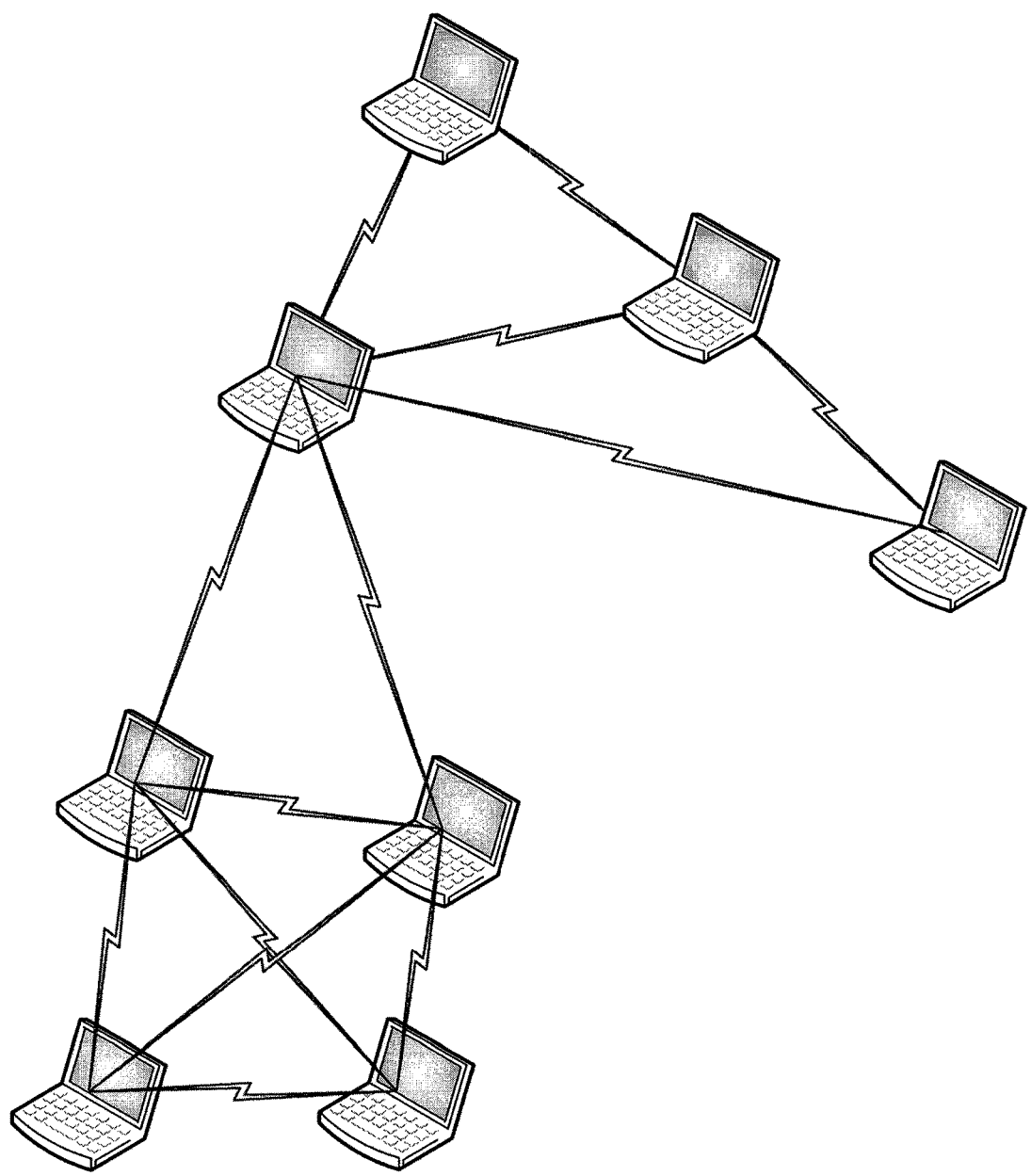
FIG. 2 is a semi-pictorial diagram of a mobile ad-hoc network system.

Different allocation prioritization mechanisms are applicable:
1. Highest user priority, as first depicted in FIG. 15
2. Highest service priority first
3. Maximum users in service
4. Maximum services in service
5. Equally distributed
6. Any combination of the above Hierarchical distributed service management schemes are now described.

The hierarchical distributed management method is an alternative to the centralistic approach. Each relay apparatus (RA) is responsible for the service management of the SMs and relay apparatus (RA) that are below it in the hierarchical topology graph. A service establishment message goes from the mobile communication device through its serving relay apparatus (RA); in case the relay apparatus (RA) is above the destination in the hierarchical topology, the serving relay apparatus (RA) accepts/rejects the request, otherwise it forwards the request to its serving relay apparatus (RA), and in case the relay apparatus (RA) is connected to a base station (BS), the request is forwarded to the RS.

Once the serving relay apparatus (RA) is identified, the serving relay apparatus (RA) runs a similar service allocation mechanism. The serving relay apparatus (RA) may then accept or reject the service request, and it may also update an older service.

Once service is accepted, the serving relay apparatus (RA) sends setup service messages to links that are along the route from the creator of the service request to the destination of the service request. The service setup message notifies the resource schedulers of the RAs along the route about the new resource allocations.

Heuristic hierarchical service management uses certain heuristics in order to preserve resources for future use. For example, when a relay apparatus (RA) attaches to another relay apparatus (RA), it may request certain resource allocations from its serving relay apparatus (RA). The number of resource allocations may be a function of:

1. The number of registered users to the current relay apparatus (RA)
2. The priority and the number of users, i.e. a user with high priority may get higher priority resource allocation.

Suitable hierarchical real-time backhauling prioritization based on service requests in a multi-hop network, are now described.

Figure 16:
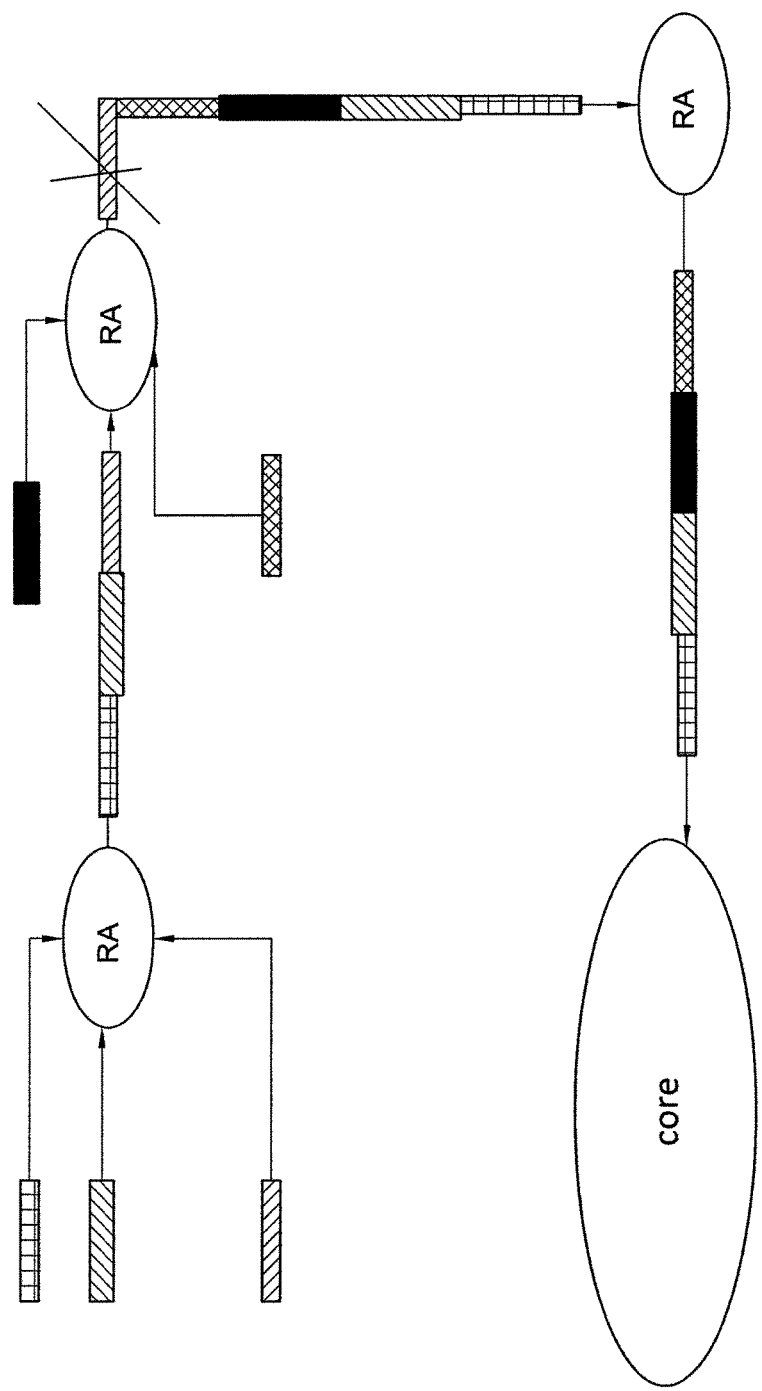
FIG. 16 is a diagram of a message dropped without any priority scheduler, constructed and operative in accordance with certain embodiments of the present invention.

In a conventional network each message has a chance to be dropped by the scheduler, due to overloads in the outgoing queue. Corresponding to that, a message which goes through several hops has a higher probability to be dropped, which increases with the number of hops, as depicted in FIG. 16. Moreover, due to latency requirements, a message that goes through several hops might be too late, due to waiting in several outgoing queues. A scheduler mechanism ensures that every user gets its bandwidth share according to service requirements, even though they are located at different hop-distances from the core. A scheduler mechanism which resides in the relay apparatus (RA), is proposed.

Different queuing mechanisms are applicable in the RAs scheduler such as but not limited to any of the following or suitable combinations thereof:
1. Priority queuing, where each queue has its own priority. The queues are processed from the highest priority to the lowest priority. A message that goes through several hops may gain priority in each hop, in that way that its chance of being dropped in the next hop decreases proportionally to the number of hops. The disadvantage of this mechanism is that low priority messages from distant SMs may starve low\mid priority messages from SMs that are adjacent to the core.
2. Weighted fair queuing, where each queue has its own weight. A higher priority queue gets a higher weight. Each priority queue is divided into 3 or more sub-queues, where each queue represents the number of hops that the message has passed. Queues are serviced in a round-robin schedule, where a higher queue gets proportionally higher outgoing BW, and the sub-queues are processed from the highest priority to the lowest. Thus, the chance of a message being dropped proportionally to the number of hops is decreased, without starving mid/high services for near core SMs. The disadvantage of this method is that in case of a burst, the queue can become congested, leading to a drop of all messages in the queue.
3. Burst early detection for a multi hop network using weighted queues and priority queues. Using the proposed weighted fair queuing, each queue is tagged with max-queue-size and mid-queue-size. When queue exceeds the mid-queue-size, its messages are randomly dropped, giving higher dropped probability to messages with lower hop count. When queue exceeds its max-queue-size, all messages are dropped from the queue.

In addition, the scheduler mechanism may add the heuristic mechanism for selecting the messages to be dropped. An example is a high priority message with low delay requirement, which is hopping for n hops, where the current node is approximately m hops away from the destination. This means that by the time a message reaches its destination, it is probably irrelevant.

The terms in the table of FIG. 17 may be construed either in accordance with any definition thereof appearing in the prior art literature or in accordance with the specification, or as stipulated in the table. The present invention is intended to include a base station effecting any portion of any of the functionalities shown and described herein.

The present invention is also intended to include a handset effecting any portion of any of the functionalities shown and described herein.

It is appreciated that various embodiments of the invention e.g. as shown and described herein are useful in conjunction with a mobile communication network system operative in conjunction with a core network including a core device and at least one static base station, the system comprising a plurality of base stations; and a population of mobile stations communicating via antennae with the base stations; the base stations including at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable static base station, wherein the first radio manager comprises a radio resource manager; and functionality for receiving information from, and sending information to, other radio managers, respectively co-located with other moving base stations, and for using the information to determine whether to reject at least one mobile station seeking to be served by an individual base station associated with the individual co-located radio manager.

It is appreciated that various embodiments of the invention e.g. as shown and described herein are suitable for multi-hop applications in which at least one relay is served by another relay rather than being served directly by a base station.

It is appreciated that various embodiments of the invention e.g. as shown and described herein are suitable for application to a wide variety of mobile communication technologies. For example:

3GPP Long Term Evolution (LTE), is a standard in mobile network technology which provides the following features:
Peak download rates of 326.4 Mbit/s for 4×4 antennae, and 172.8 Mbit/s for 2×2 antennae (utilizing 20 MHz of spectrum).[8]
Peak upload rates of 86.4 Mbit/s for every 20 MHz of spectrum using a single antenna. [8]
Five different terminal classes have been defined from a voice centric class up to a high end terminal that supports the peak data rates. All terminals are able to process 20 MHz bandwidth, according to certain embodiments.
At least 200 active users in every 5 MHz cell. (Specifically, 200 active data clients)
Sub-5 ms latency for small IP packets
Increased spectrum flexibility, with supported spectrum slices as small as 1.4 MHz and as large as 20 MHz (W-CDMA requires 5 MHz slices, leading to some problems with roll-outs of the technology in countries where 5 MHz is a commonly allocated amount of spectrum, and is frequently already in use with legacy standards such as 2G GSM and cdmaOne.) Limiting sizes to 5 MHz also limited the amount of bandwidth per handset.
In the 900 MHz frequency band to be used in rural areas, supporting an optimal cell size of 5 km, 30 km sizes with reasonable performance, and up to 100 km cell sizes supported with acceptable performance. In city and urban areas, higher frequency bands (such as 2.6 GHz in EU) are used to support high speed mobile broadband. In this case, cell sizes may be 1 km or even less.
Support for mobility. High performance mobile data is possible at speeds of up to 350 km/h, or even up to 500 km/h, depending on the frequency band used.[9]
Co-existence with legacy standards (users can transparently start a call or transfer data in an area using an LTE standard, and, should coverage be unavailable, continue the operation without any action on their part using GSM/GPRS or W-CDMA-based UMTS or even 3GPP2 networks such as cdmaOne or CDMA2000)
Support for MBSFN (Multicast Broadcast Single Frequency Network). This feature can deliver services such as Mobile TV using the LTE infrastructure, and is a competitor for DVB-H-based TV broadcast.

The features of E-UTRAN, the air interface of LTE, are:
Peak download rates up to 292 Mbit/s and upload rates up to 71 Mbit/s depending on the user equipment category.
Low data transfer latencies (sub-5 ms latency for small IP packets in optimal conditions), lower latencies for handover and connection setup time than with previous radio access technologies.
Support for terminals moving at up to 350 km/h or 500 km/h depending on the frequency band.
Support for both FDD and TDD duplexes as well as half-duplex FDD with the same radio access technology.
Support for all frequency bands currently used by IMT systems by ITU-R.
Flexible bandwidth: 1.4 MHz, 3 MHz, 5 MHz 15 MHz and 20 MHz are standardized.
Support for cell sizes from tens of meters radius (femto and picocells) up to 100 km radius macrocells
Simplified architecture: The network side of EUTRAN is composed only by the enodeBs
Support for inter-operation with other systems (e.g. GSM/EDGE, UMTS, CDMA2000, WiMAX . . . )
Packet switched radio interface.

It is appreciated that various embodiments of the invention e.g. as shown and described herein are suitable for application to LTE and/or EUTRAN technology as well as to technologies possessing some but not all of the above features.

LTE Advanced is a 4th generation standard (4G)[2] of radio technologies designed to increase the capacity and speed of mobile telephone networks. Its features may include some or all of:
Relay Nodes
UE Dual TX antenna solutions for SU-MIMO and diversity MIMO
Scalable system bandwidth exceeding 20 MHz, Potentially up to 100 MHz
Local area optimization of air interface
Nomadic/Local Area network and mobility solutions
Flexible Spectrum Usage
Cognitive radio
Automatic and autonomous network configuration and operation
Enhanced precoding and forward error correction
Interference management and suppression
Asymmetric bandwidth assignment for FDD
Hybrid OFDMA and SC-FDMA in uplink
UL/DL inter eNB coordinated MIMO It is appreciated that various embodiments of the invention e.g. as shown and described herein are suitable for application to LTE-Advanced technology as well as to technologies possessing some but not all of the above features.

WiMAX (Worldwide Interoperability for Microwave Access) is a telecommunications protocol that provides fixed and fully mobile Internet access. Features include:

Adding support for mobility (soft and hard handover between base stations). This is seen as one of the most important aspects of 802.16e-2005, and is the very basis of Mobile WiMAX.

Scaling of the Fast Fourier transform (FFT) to the channel bandwidth in order to keep the carrier spacing constant across different channel bandwidths (typically 1.25 MHz, 5 MHz, 10 MHz or 20 MHz). Constant carrier spacing results in a higher spectrum efficiency in wide channels, and a cost reduction in narrow channels. Also known as Scalable OFDMA (SOFDMA). Other bands not multiples of 1.25 MHz are defined in the standard, but because the allowed FFT subcarrier numbers are only 128, 512, 1024 and 2048, other frequency bands will not have exactly the same carrier spacing, which might not be optimal for implementations.

Advanced antenna diversity schemes, and hybrid automatic repeat-request (HARQ)

Adaptive Antenna Systems (AAS) and MIMO technology

Denser sub-channelization, thereby improving indoor penetration

Introducing Turbo Coding and Low-Density Parity Check (LDPC)

Introducing downlink sub-channelization, allowing administrators to trade coverage for capacity or vice versa Adding an extra QoS class for VoIP applications.

It is appreciated that various embodiments of the invention e.g. as shown and described herein are suitable for application to WiMax technology as well as to technologies possessing some but not all of the above features.

More generally, the methods and systems shown and described herein as being applicable e.g. to certain protocols are also applicable to protocols which are not identical to the mobile communication protocols specifically mentioned herein but have relevant features in common therewith.

Flowchart illustrations appearing herein are intended to describe steps of an example method where, alternatively, a method may be substituted which includes only some of the steps illustrated and/or a method in which the steps are differently ordered.

Load balancing management using topology graph in the RS, according to certain embodiments, has already been described. It is appreciated that in conventional cellular networks, mobile user equipment attaches to the base station with the highest radio power. From there the base station can hand over the mobile equipment to another base station in the event of load on the current serving base station or if the mobile user equipment moves such that there is now a better serving base station. In such a case, conventional serving base stations may move the user equipment to the better one.

In a hierarchical cellular network it is desirable to maximize usage of the backhauling resource, e.g. using a centralistic topology building dynamic method that considers aspects of user requirement in real-time and changes the topology by ordering handovers. According to another embodiment, a greedy distributed local manager may be employed to listen to broadcast messages indicating the backhauling grade of the near neighbors. This information may for example be reported using the measurement report of a UE (user equipment e.g. mobile communication device) which is currently attached to the serving base station. Alternatively or in addition, the greedy distributed local manager may obtain near neighbors' grades from a centralistic manager by providing cell IDs as received.

Figure 18A:
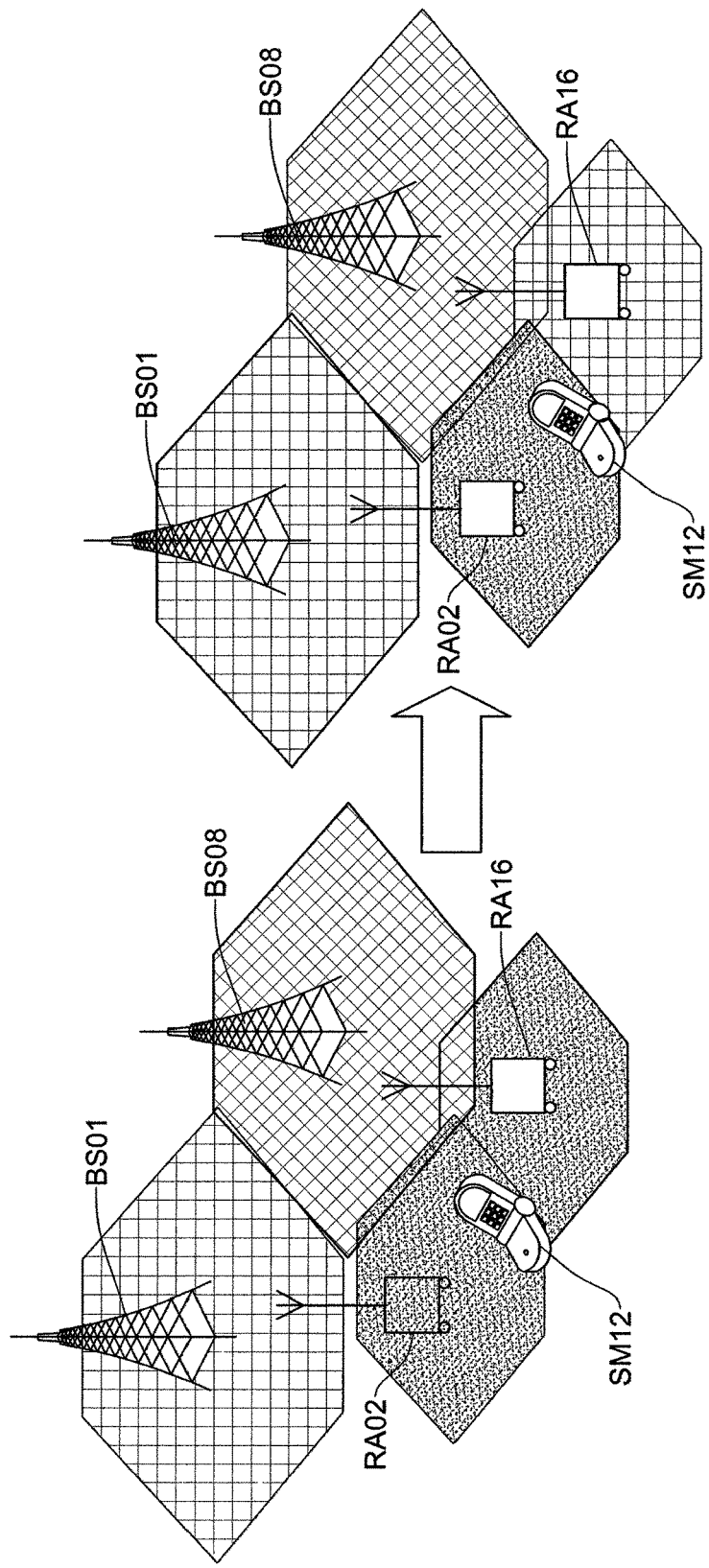
FIG. 18a is a semi-pictorial diagram of a cellular network, before and after cell planning in accordance with certain embodiments of the present invention.
Figure 18B:
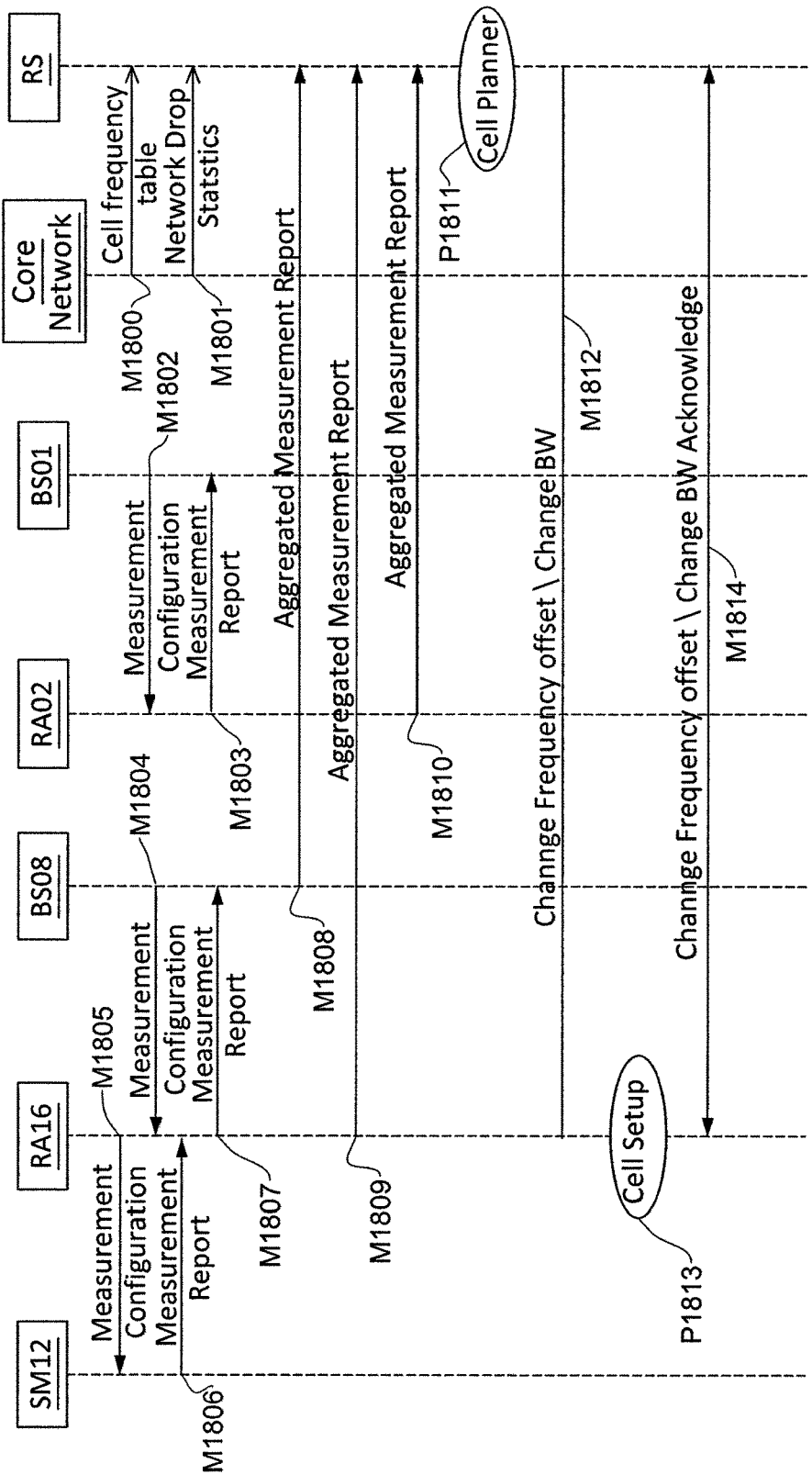
FIG. 18b is an example of a sequence diagram of a cell planning method using a centralized cell planner in accordance with certain embodiments of the present invention.

FIG. 18a is a semi-pictorial diagram of a cellular network, before and after operation of a cell planning method. FIG. 18b describes a cell planning method using a centralistic cell planner manager, in which arena measurement reports are reported to a centralistic relay manager. Measurement reports may include the cell id of the neighboring cellIDs. The cellID may be combined with a frequency allocation table [e.g. M1800] per cellID and drop rate statistics or coding modulation statistics or Uplink Reference Signal statistics[M1801] enables building a topology graph and frequency per cell optimizer [p1811] that orders cell reallocation messages [m1812] in order to change the frequency that the base station is using. This may result in a cell setup procedure [P1813]. It is appreciated that typically the cell ID+neighboring list constitutes a topology graph.

The term "arena" above include a local area for which base station power measurements are received by each UE (user equipment e.g. mobile communication device).

Figure 18C:
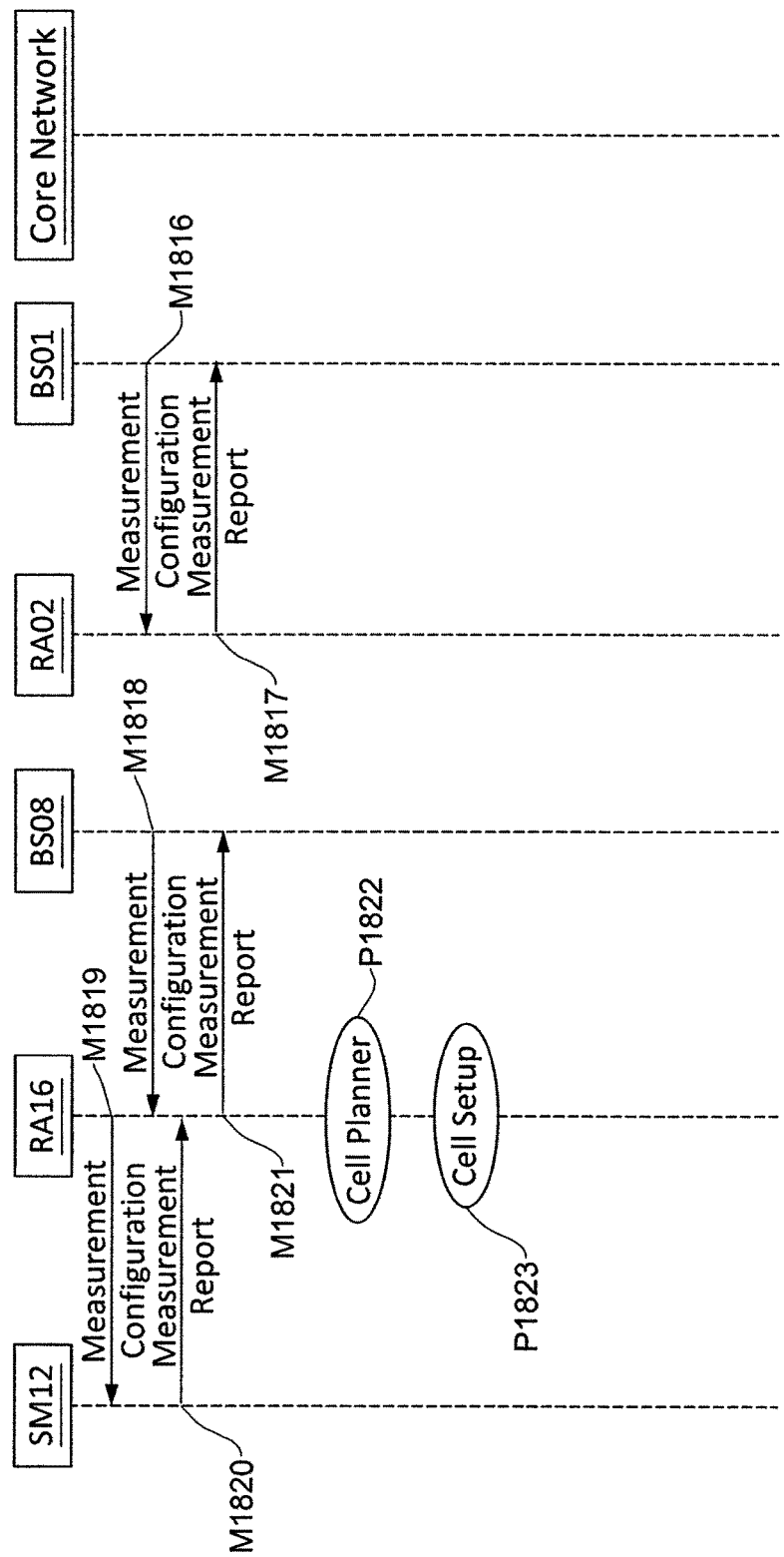
FIG. 18c is an example of a sequence diagram of a cell planning method using distributed cell planner, in accordance with certain embodiments of the present invention.

FIG. 18c depicts a distributed cell planning method in which measurement reports of served UEs (relay apparatus (RA)\mobile communication device) are reported to a local relay manager in the relay apparatus (RA). In this case the local relay managers are each aware of their neighboring RAs and static base station, which can be identified by their unique cell ID in the measurement report. A new neighboring cell index indicated in the measurement report and a sudden drop in the reception of the communication by the served base station may indicate interference by a neighboring cell. When this occurs the serving base station's local cell planner may decide to change its allocated frequency and move to another base station [p1822]. In this case the "local" cell planner i.e. that which resides in the relay apparatus, hands over its served UE (user equipment e.g. mobile communication device) to another base station and resets its local base station on another frequency [p1823]. In order to minimize the number of the reset the cell with the lowest cell ID in the neighbors list may choose itself as the chosen cell for a reset. The new selected frequency may for example be chosen randomly.

Figure 19A:
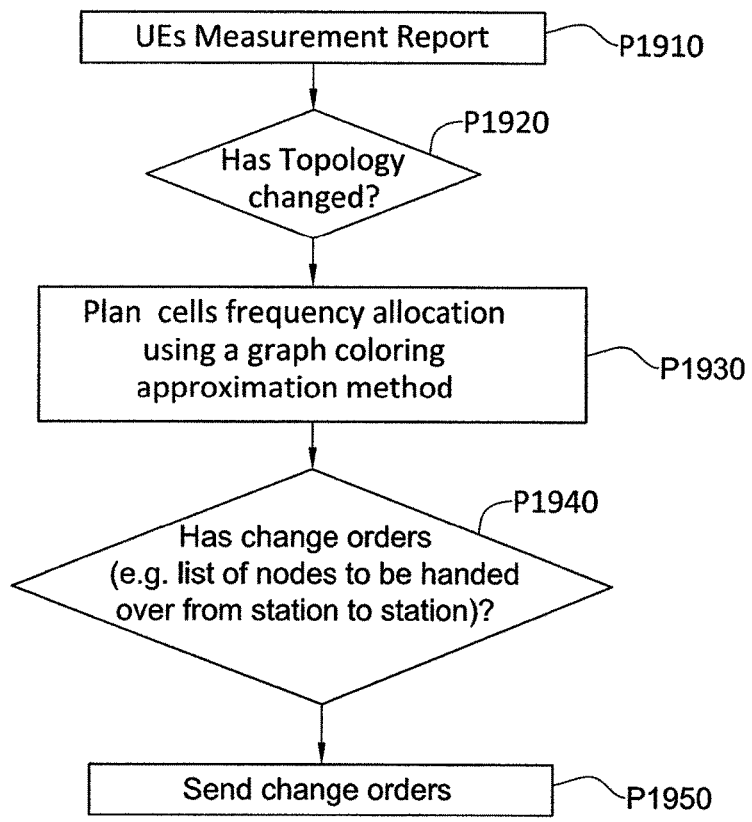
FIG. 19a is an illustration of an example methodology for centralistic cell planning, in accordance with certain embodiments of the present invention.

FIG. 19a depicts an example of a centralistic cell planning optimizer. In the embodiment of FIG. 19a, measurements are aggregated [p1910] in case of a topology change. For example cell A indicates that cell B has now become a neighbor [p1920]. A graph coloring approximation algorithm like Wigderson's algorithm runs over a current graph [p1930] in order to find an optimal frequency allocation map. In case of a change in frequency allocation the new frequency allocation is sent to the anchored relay apparatus (RA) that is operative to change the frequency in the network.

Figure 19B:
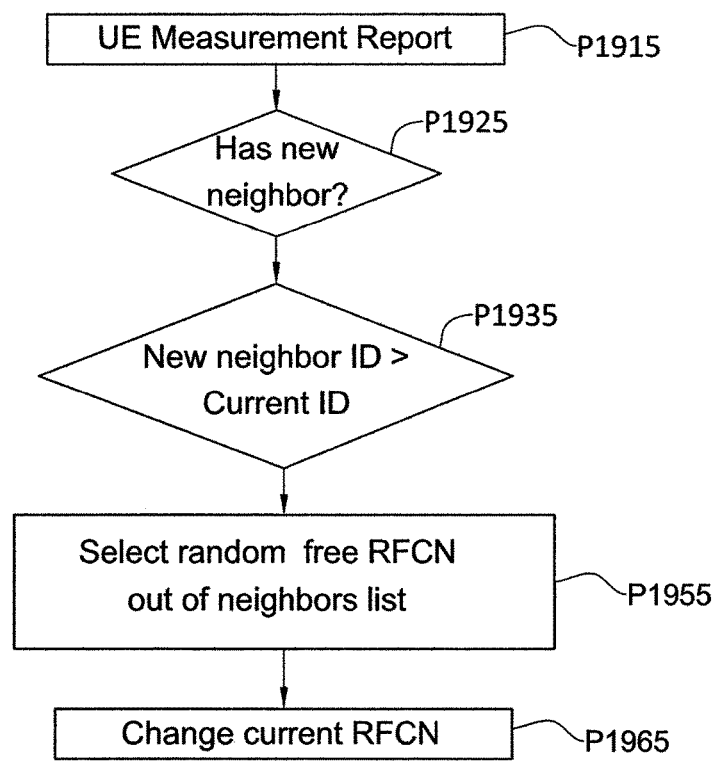
FIG. 19b is an illustration of an example methodology for distributed cell planning, in accordance with certain embodiments of the present invention.

FIG. 19b depicts an example of a distributed cell planning optimizer. In the embodiment of FIG. 19b, measurement of current anchoring devices are aggregated in a local agent which resides in the relay apparatus (RA) [p1915]. In case of a topology change for example a new neighboring cell might appear in the measurement report [p1925]. In case the cellID of the new neighbor is larger than this current base station, the current base station selects a new random free RFCN (Radio frequency channel number) and changes its current Radio frequency channel number to the new one [p1965].

Figure 3:
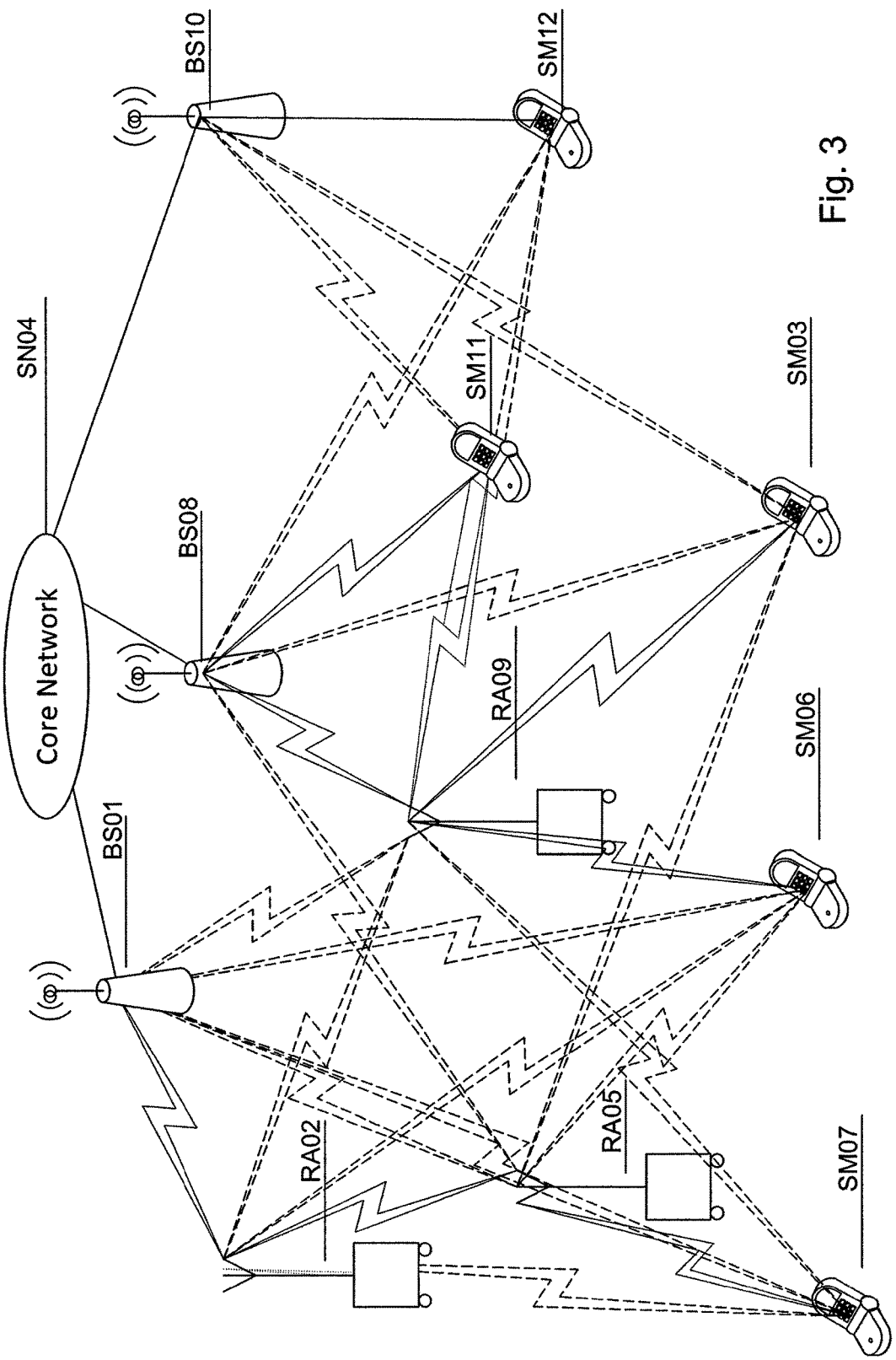
FIG. 3 is a semi-pictorial diagram of an n-level hierarchical cellular system of the invention.
Figure 20:
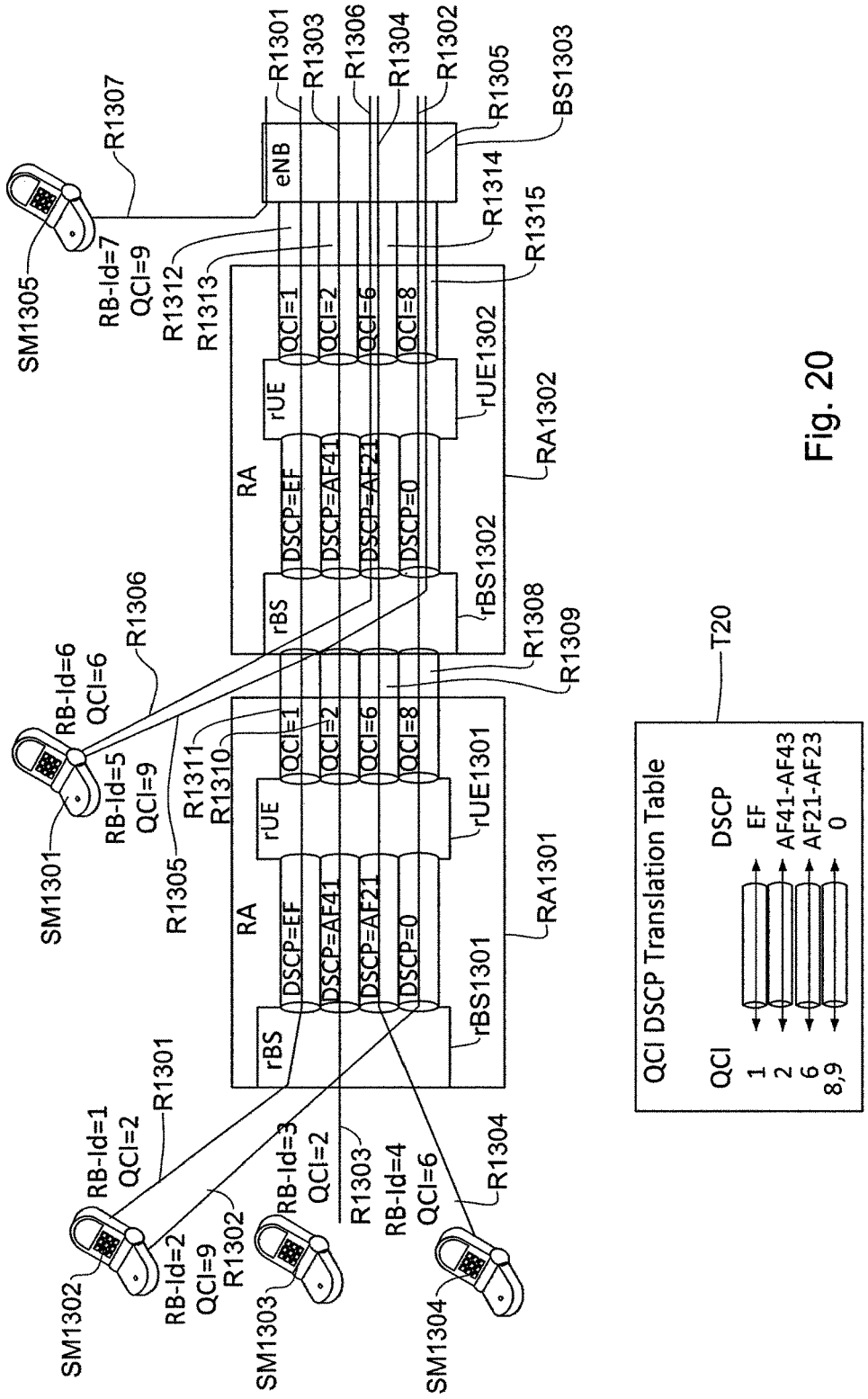
FIG. 20 is an example of QoS priority management using a QCI (quality of service class indicator) DSCP translation table, in accordance with certain embodiments of the present invention.

FIG. 20 depicts a scalable per hop quality of a service mechanism which employs a DSCP to QCI (quality of service class indicator) Translation table. QCI (quality of service class indicator) is a flow QoS indication field that is used in LTE in order to differentiate different applications' QoS (Priority, Packet delay, packet error) parameters. The differentiation is per flow based meaning that the management is done in a centralistic way and is coordinated with all crossing network entities (P\S-GW, eNB). Using a DSCP to QCI (quality of service class indicator) translation table [T20] enables managing of QoS in the eNB (e.g. 4G base station) rather than in a central manager and enables a simple QoS mechanism in a multi-hop eNB (e.g. 4G base station) relay system e.g. as shown in FIG. 3. Different flows (bearers) [r1301, R1302, R1303, R1304, R1305, R1306, R1307] having different QCI (quality of service class indicator)parameters enter the serving base stations [relay base station 1301, relay base station 1302, BS1303].

Each rUE, such as rUE1302, rUE1301 in the illustrated embodiment, typically has its own set of predefined backhauling bearers [r1308, R1309, R1310, R1311, R1312, R1313, R1314, R1315] with its own predefined QCI. The relay base stations are configured that the packets that are sent to the core are mapped according to the DSCP to QCI (quality of service class indicator) translation table, for example entering bearer having QCI 1 may be forwarded over a GTP tunnel having DSCP=EF in its IP header TOS field. The relay UEs are typically configured with the inverse table providing translation of DSCP to QCI. For example a packet having EF in its IP header's TOS field may be mapped to QCI 1.

Referring again to FIGS. 13 and 14, it is appreciated that in the illustrated embodiment examples of suitable logical combination strategies are provided which are merely exemplary and are not intended to be limiting. SM07, SM08, SM01, SM05 register to service A, which requires a guaranteed bit rate of 100 kbs. RA09 aggregates these requests and requests a bearer with guaranteed 400 kbs from its serving base station, RA02. SM06, SM03 and SM12 are registered to another service B, which requires a maximal 1 Mbs per client. RA02 aggregates these requests and requests a maximal of 4 Mbs in one bearer and another bearer with guaranteed 400 kbs from its serving base station RA19. SM10 registers to service A and SM11 and SM13 register to service B. RA19 aggregates these requests and requests a maximal 6 Mbs in one bearer for service B and guaranteed 500 kbs for service A from its serving stationary base station BS08. In the event that all the resource allocations of RA19 are accepted, it accepts SM10, SM13, SM11 and RA02 resource allocation requests. RA02 accepts SM03, SM06, RA09 and SM12 resource allocation requests. RA09 accepts SM07, SM08, SM01 and SM05 resource allocation requests.

In case of a rejection in the resource allocation requests of RA19, RA19 may request fewer resources. For example BS08 rejects resource allocation of guaranteed 600 kbs and 6 Mbs. Responsively, RA19 now requests guaranteed 500 kbs in one bearer and 2 Mbs in another bearer and this allocation is accepted by the BS08. RA19 may now partially accept its client requests. SM11 and SM13 requests are accepted while SM10 request is rejected and RA02 request for guaranteed 500 kbs is accepted. This typically occurs because, as in the illustrated example, the relay apparatus RA has a higher priority than an ordinary mobile communication device (e.g. SM). So, e.g in case of lack of resources, an attempt tis made to answer relay apparatus resource allocation requests first.

RA02 rejects SM12, SM03 and SM06 requests and accepts RA09 requests. RA09 accepts all its client requests.

Referring again to FIG. 14, it is appreciated that a relay apparatus (RA) may serve as a local routing point for its clients; in this case there is a need for allocation of resources only for nodes that are between the clients. Alternatively, the relay apparatus (RA) may not serve as a local routing point in which case there is a need for resource allocation from each client to the core network in order to establish a connection between two clients. In the event that relay apparatus (RA) serves as a local router, SM06 requests a service allocation of guaranteed 100 kbs that includes its designated address SM11. RA09 does not know where SM11 resides so it requests a service allocation of guaranteed 100 kbs that includes the designated address SM11, from its serving base station RA02. RA02 knows that SM11 is one of its siblings, so it establishes a connection with SM11 and sends an accept message responsive to RA09 request. RA09 receives the accept message and forwards it to SM06. This allows management of the local established connection between SM06 and SM11 to be provided through RA09 and RA02 for example for billing. RA02 may request a bearer with a smaller BW just for billing information or may use an already established connection of RA02 with the core over RA19 and BS08. In the event that the relay apparatus (RA) is not serving as a local router, establishment of the request for service needs to be confirmed by the core network. RA02 forwards the request to RA19, and then RA19 forwards the request to BS08 and to the core network. The core network establishes a connection with SM11 through BS08, RA19 and RA02. When the request is accepted, the accept message goes back from SM11 through RA02, RA19, BS08, Core network, BS08, RA19, RA02, RA09 and SM06.

Reference is now made to FIGS. 21a-21d which are respective examples of sequence diagrams of the load balancing method in various example architectures.

Figure 21A:
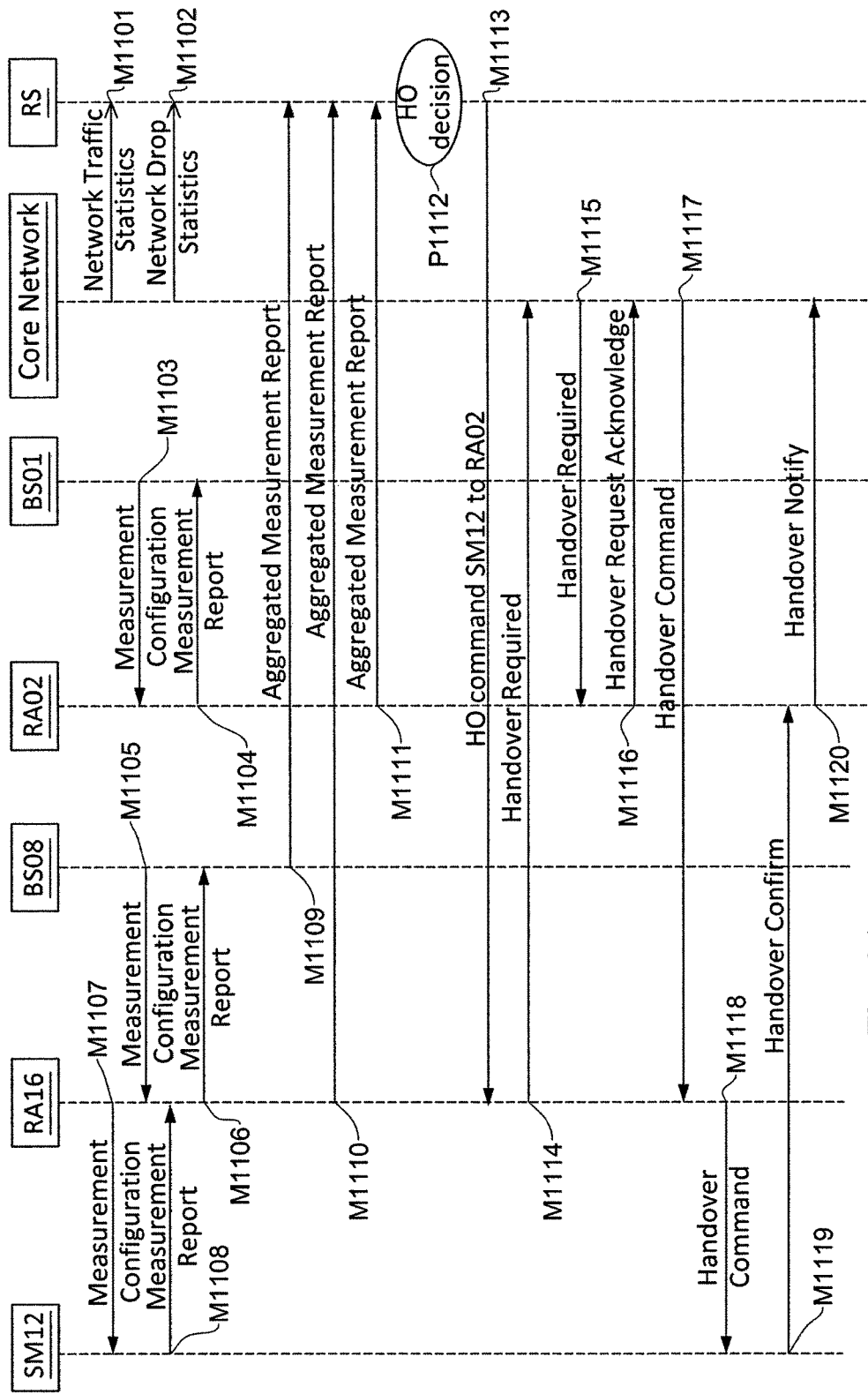
FIGS. 21a-21d are respective examples of sequence diagrams of the load balancing method in different architectures.
Figure 21B:
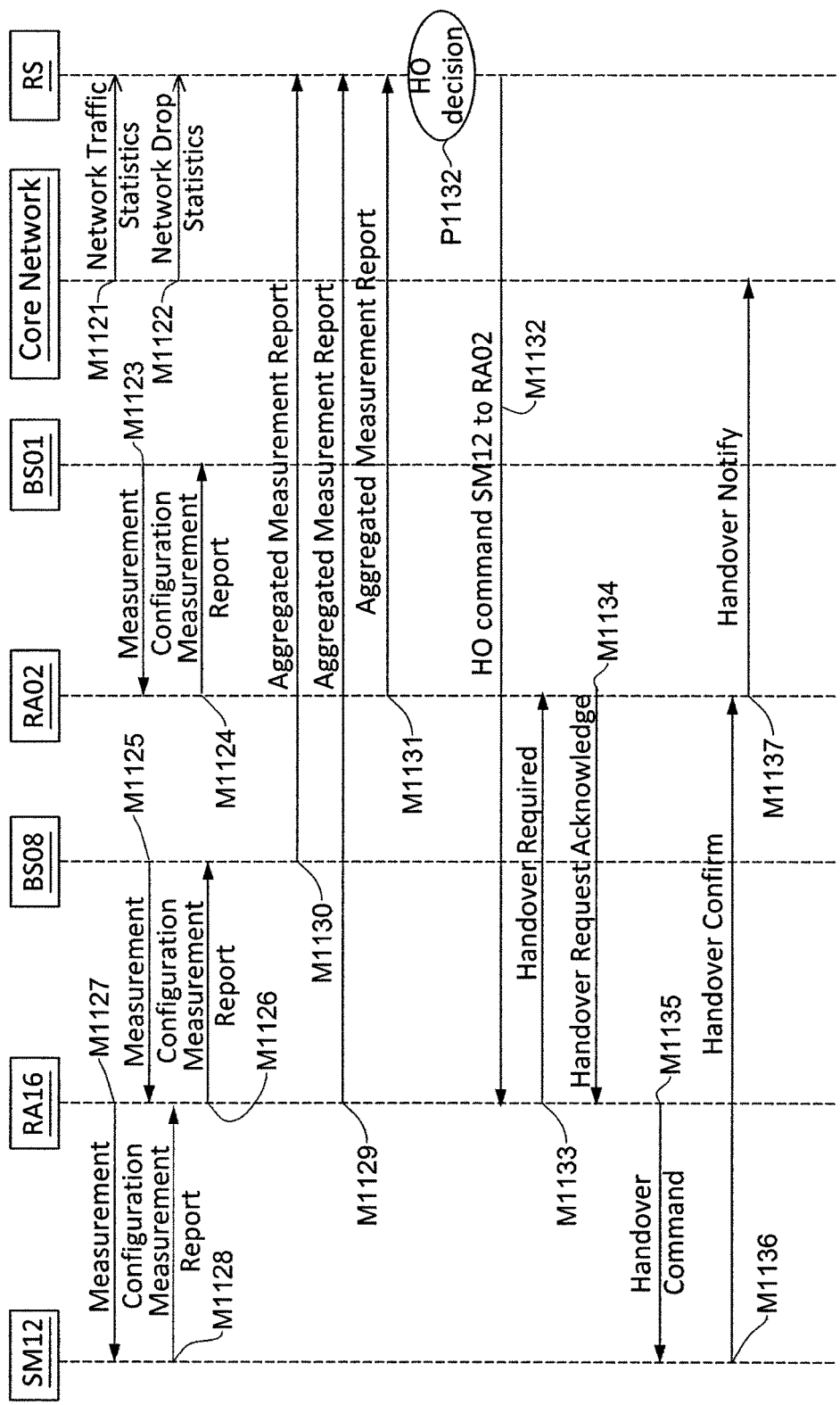

FIGS. 21a-21b illustrate a load balancing method using a centralistic routing manager. Arena measurement reports are reported to a centralistic routing manager. Measurement reports are used with a combination of network throughput and drop rate statistics in order to estimate the potential capacity of each potential link. A potential link is between a UE (mobile communication device or relay apparatus (RA)) and an eNB (e.g. 4G base station) when the UE e.g. mobile communication device sends a measurement report on the eNB (this term being used herein throughout to include a suitable 4G base station) to its serving eNB (relay apparatus (RA) or base station (BS)). The potential link typically also includes a measurement report of the UE e.g. mobile communication device on its current serving eNB.

FIG. 21a uses the S1 interface in order to request an HO. Measurement reports may be aggregated by the various relay agents (RA16 and RA02 in the example) and reported [m1109], [m1111]. The relay server decides on a handover [p1112] e.g. according to a smart decision procedure. The smart decision procedure affiliates measurement reports (typically translated into grades by using a suitable first grade translation table), with network traffic statistics (also typically translated into grades using a suitable second grade translation table), drop statistics (also typically translated into grades using a suitable third grade translation table), service requirements and any valuable data resource (for example GIS). Suitable metrics are used to give an intermediate grade for each link. Then the metric is sent to an optimizer, e.g. as described below, that orders handover if it is deemed to be needed.

An optimizer may for example comprise a dijkstra or other suitable algorithm that finds the shortest path from the core to various nodes where the affiliated measurement reports are used as a weight metric in a linear sum. The reports are typically translated into grades by using different translation grades to represent each data type and aggregating all the grades into a single scalar.

The method of FIG. 21b is similar to the method of FIG. 21a except that a conventional X2 handover procedure [m1133-M1137] is employed.

Figure 21C:
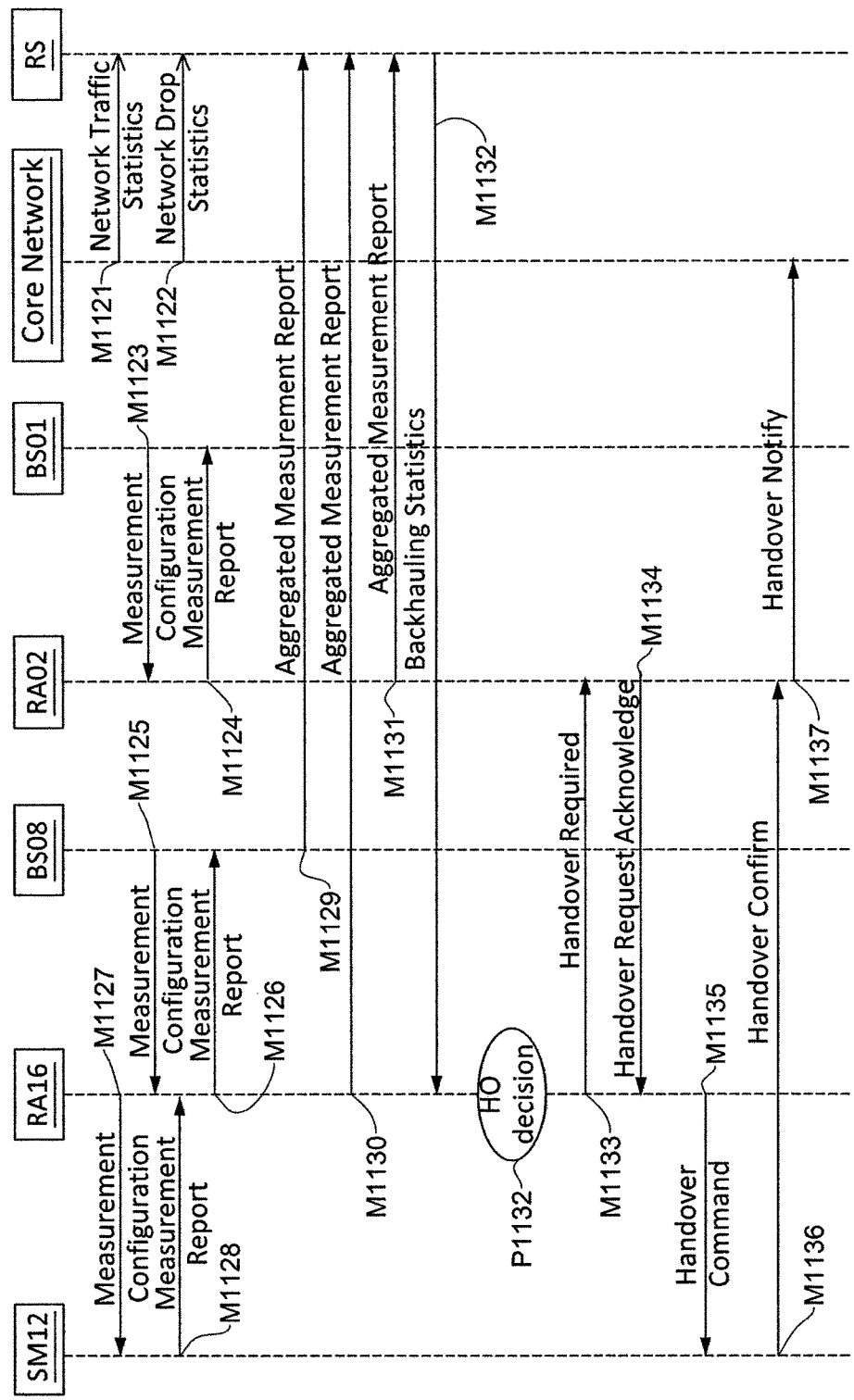

FIG. 21c depicts a load balancing method that combines both centralistic manager and local routing managers. As in the embodiment of FIG. 21a, the centralistic manager is operative to compute the backhauling quality grade of each network node. The manager then sends the quality grade to the clients (relay apparatus (RA)). According to the backhauling quality grade of its neighbors and radio measurement messages, a local routing manager can order a handover if there is a better alternative for a client. For example, each relay agent may be programmed to handover a camped UE (relay apparatus (RA) or mobile communication device) to another serving base station having a minimal hearing quality grade+backhauling quality grade and wherein the minimal hearing quality grade+backhauling quality grade<current hearing quality grade+backhauling quality grade. In the example, SM12 sends measurement report [m1128] that indicates that it hears RA02 and RA16. The quality grade of the power for SM12->RA16=4, SM12->RA02=6, so SM12 doesn't handover to RA02. The relay service indicates that [m1132] RA02 backhauling quality grade=2 and RA16 backhauling quality grade is 5. Now, the total quality grade SM12->RA02->core=8 and SM12->RA16->core=9 and therefore RA16 sends a "handover required" [m1133] message and handover SM12 to RA02. FIG. 14 schematically describes this method.

Figure 21D:
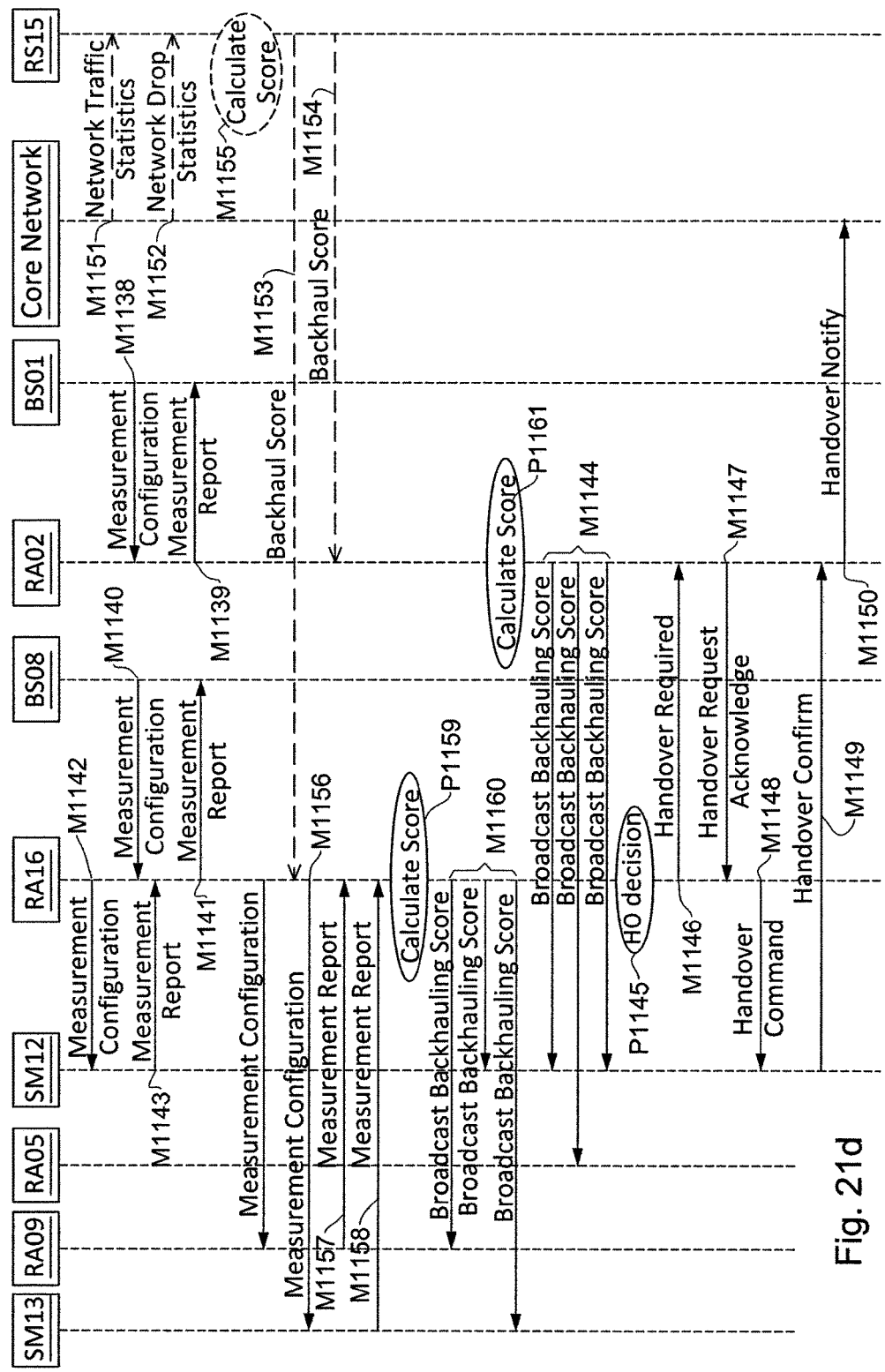

FIG. 21d depicts a distributed load balancing method in which the backhauling grade is exchanged between various relay agents e.g. by sending broadcast messages[m1144, m1160]. It is possible to send broadcast messages using various radio access devices or by overriding an existing field in the standard. The local routing manager computes its backhauling quality grade by adding its current weight to the quality grade of its backhauling link. A relay server may be added in order to consider additional parameters [m1153, m1154].

For example, each relay agent is programmed to handover a camped UE (relay apparatus (RA) or mobile communication device) to another serving base station that has the minimal hearing quality grade+backhauling quality grade and wherein the minimal hearing quality grade+backhauling quality grade<current hearing quality grade+backhauling quality grade. In the example SM12 is connected to RA16, it sends measurement report [m1143] that indicates that the quality grade of SM12->RA16=4 and SM12->RA02=6, so SM12 doesn't handover to RA02. RA09 hears only RA16 at quality-6 and SM13 at quality=4. RA16 hears BS08 at quality=5, so its current backhauling quality grade is 5. RA16 broadcasts this grade using the broadcast backhauling channel. Now the quality of SM12->RA16->Core=9, the backhauling quality grade of RA09=11 and SM13->RA16->Core=9. RA02 hears BS01 at quality=2 so its backhauling quality=2. RA02 broadcasts that its backhauling quality=2 [m1144]. RA16 hears that RA02 backhauling quality grade=2—[m1144] either directly by listening to the backhauling broadcast channel or indirectly e.g. by getting measurement messages from equipment that are aware of RA02 backhauling quality. Now, the total quality grade SM12->RA02->core=8 and SM12->RA16->core=9 and therefore RA16 sends a handover required[m1146] message and handover SM12 to RA02. FIG. 14 schematically describes this method.

It is appreciated that according to certain embodiments, a base station may serve a mobile communicator or mobile communicators which have at least one allocation limitation. The limitation may be regarding minimal bandwidth, below which any bandwidth allocated is not useful. Or the limitation may be regarding a quantization of bandwidth, such that bandwidth values other than certain discrete values are only utilized at the level of the discrete value below the actual supplied value. Or the limitation may be regarding minimal error rate such that bandwidth suffering from an error rate greater than the minimal error rate cannot be used by the mobile communicator. Or the limitation may be regarding the type of user manning the mobile communicator (senior vs. junior, etc.). Typically, the base station knows to allocate bandwidth such that each such mobile communicator receives an allocation which can be utilized fully or as fully as possible, despite the mobile communicator's limitations.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or clients for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A communication system having a core and comprising:
 a multihop cellular network including base stations serving mobile stations and a plurality of relays having mobile station functionality, base station functionality and backhauling link functionality, and operable to manage quality-of-service (QoS) of at least one of the mobile stations, wherein
  at least one relay of the plurality of relays comprises a mobile cellular communication network node operative to:
   serve, including communicating via antennae, at least one of the mobile stations or other relays of the plurality of relays different than the at least one relay, and
   to be served by at least one of the base stations or other relays,
  the node includes:
   a first radio manager;
   mobile communicator means which communicates via antennae with at least one selectable base station; and
   base station functionality which has a physical back-connection to the first radio manager,
  the first radio manager has a physical connection with the mobile communicator means,
  for at least one individual relay from among said plurality of relays, a backhauling link of the individual relay has QoS management functionality in order to support the QoS of at least one of the mobile stations, and
  the at least one individual relay requests at least one bearer each having a defined quality of service, defined by a cellular protocol to characterize a communication channel, from its serving base station, and uses said at least one bearer for supporting the QoS of at least one of the mobile stations,
  QoS priority management is provided in at least one of a base station and a relay which translates to a quality of service class indicator, used in a cellular protocol governing the network, to differentiate different applications' QoS parameters,
  per-bearer differentiation in a multi-hop base station relay system is achieved by managing QoS in at least one of said base stations rather than in a central manager,
  for different bearers which have different quality of service class indicators and which enter serving base stations,
   the backhauling link functionality in each relay in said plurality of relays has its own set of pre-defined backhauling bearers with its own pre-defined quality of service indication field,
   the base station functionalities of at least some relays in said plurality of relays are configured to map packets that are sent to the core to the quality of service indication field, and
   backhauling link functionalities of at least some relays in said plurality of relays are configured for an inverse mapping of packet classification information to the quality of service indication field.

2. The system according to claim 1, wherein the first radio manager comprises:
 a radio resource manager; and
 functionality for receiving information from, and sending information to, other radio managers, respectively co-located with other relays, and for using the information to determine whether to reject at least one mobile communicator seeking to be served by an individual base station associated with the first radio manager.

3. The system according to claim 1, wherein the bearer requested is of size S for each service requiring a bit rate B, to which at least one of relays and mobile communication devices below said individual relay have registered.

4. The system according to claim 3, wherein said size S is no less than the number of relays and mobile communication devices below said individual relay registered for said service, times said bit rate B.

5. The system according to claim 1, wherein
 the network has at least one base station B operative to receive resource allocation requests and to allocate uplink bandwidth accordingly, the plurality of relays include at least one mobile relay apparatus having means for providing base station and mobile station functionalities which manage the QoS using respective first and second QoS management parameters and being operative to:
convey to the base station B a resource allocation request regarding bandwidth needs, in uplink, of mobile communicators associated with the at least one mobile relay apparatus, and
when receiving uplink bandwidth, from a base station which generates an uplink between the at least one mobile relay apparatus and the base station B, distribute the uplink bandwidth between mobile communicators associated with the at least one mobile relay apparatus, and
said needs are expressed at a service\application requirement level.

6. The system according to claim 1, wherein
the plurality of relays have links, and are operative to perform load-balancing, including balancing of QoS parameters, of at least a subset of the links in said network, by ordering hand-overs,
the at least one relay further comprises a mobile cellular communication network node N operative to:
serve, including communicating via the antennae, at least one of the mobile communicators and other relays, and
to be served by at least one of the base stations and other relays,
the node N includes:
a first radio manager,
mobile communicator functionality which communicates via the antennae with at least one selectable base station; and
base station functionality which has a physical back-connection to the first radio manager, and
the first radio manager of the node N has a physical connection with the mobile communicator functionality.

7. The system according to claim 1, wherein relay base stations are configured to map packets sent to the core according to a table translating a differentiated services code point (DSCP) to the quality of service class indicator.

8. The system according to claim 1, wherein at least one relay backhauling link functionality is configured to use an inverse table providing translation of the differentiated services code point (DSCP) to the quality of service class indicator such that an entering bearer having a particular quality of service class indicator is forwarded over a GTP (general packet radio service (GPRS) Tunneling Protocol) tunnel having a certain differentiated services code point (DSCP) value in its IP (Internet protocol) header type of service (ToS) field and then, a packet having said certain value in its IP header's TOS field is mapped to said particular quality of service class indicator.

9. A communication method operative in conjunction with a multihop cellular network including a core and base stations serving mobile stations and a plurality of relays having mobile station functionality, base station functionality, and backhauling link functionality and operable to manage quality-of-service (QoS) of at least one of the mobile stations, the method comprising:
providing at least one relay of the plurality of relays comprises a mobile cellular communication network node operative to:
serve, including communicating via antennae, at least one of the mobile stations or other relays of the plurality of relays different than the at least one relay, and
to be served by at least one of the base stations or other relays, wherein
the node includes:
a first radio manager,
mobile communicator means which communicates via antennae with at least one selectable base station, and
base station functionality which has a physical back-connection to the first radio manager,
the first radio manager has a physical connection with the mobile communicator means,
for at least one individual relay from among said plurality of relays, a backhauling link of the individual relay has QoS management functionality in order to support the QoS of at least one of the mobile stations,
the at least one individual relay requests at least one bearer each having a defined quality of service, defined by a cellular protocol to characterize a communication channel, from its serving base station, and uses said at least one bearer for supporting the QoS of at least one of the mobile stations,
QoS priority management is provided in at least one of a base station and a relay which translates to a quality of service class indicator, used in a cellular protocol governing the network, to differentiate different applications' QoS parameters,
per-bearer differentiation in a multi-hop base station relay system is achieved by managing QoS in at least one of said base stations rather than in a central manager,
for different bearers which have different quality of service class indicators and which enter serving base stations,
the backhauling link functionality in each relay in said plurality of relays has its own set of predefined backhauling bearers with its own predefined quality of service indication field,
the base station functionalities of at least some relays in said plurality of relays are configured to map packets that are sent to the core to the quality of service class indication field, and
backhauling link functionalities of at least some relays in said plurality of relays are configured for an inverse mapping of packet classification information to the quality of service indication field.

10. The method according to claim 9, wherein said network is operable to manage a QOS of at least said node.

11. The method according to claim 9, wherein said QoS of at least one of the mobile stations is managed by chaining bearers.

12. The method according to claim 9, wherein said network has a topology and wherein QOS management is performed by using initiated handovers to change the network topology.

13. A communication method comprising:
providing a muliihop cellular network including base stations serving mobile stations and a plurality of relays having means for providing mobile station functionality and operable to manage quality-of-scrvice (QOS) of at least one of the mobile stations, wherein
at least one relay of the plurality of relays comprises a mobile cellular communication network node operative to:

serve, including communicating via antennae, at least one of the mobile stations or other relays of the plurality of relays different than the at least one relay, and to be served by at least one of the base stations or other relays, the node includes:

a first radio manager RM, mobile communicator means which communicates via antennae with at least one selectable base station; and base station means which has a physical back-connection to the first radio manager, the first radio manager RM has a physical connection with the mobile communicator means, and also comprises providing for the at least one individual relay from among the plurality of relays, a backhauling link of the individual relay having QoS management functionality in order to support the QoS of at least one of the mobile stations, and said at least one individual relay requests at least one bearer, defined by a cellular protocol to characterize a communication channel, from its serving base station, and uses said at least one bearer for supporting the QOS of at least one of the mobile stations.

14. A computer program product comprising a non-transitory tangible computer readable medium having computer readable program code embodied therein, said computer readable program code adapted to be executed to implement a communication method operative in conjunction with a multihop cellular network including a core and base stations serving mobile stations and a plurality of relays having mobile station functionality, base station functionality, and backhauling link functionality and operable to manage quality-of-service (QoS) of at least one of the mobile stations, the communication method comprising:

providing at least one relay of the plurality of relays comprises a mobile cellular communication network node operative to:

serve, including communicating via antennae, at least one of the mobile stations or other relays of the plurality of relays different than the at least one relay, and to be served by at least one of the base stations or other relays, wherein the node includes:

a first radio manager, mobile communicator means which communicates via antennae with at least one selectable base station, and base station functionality which has a physical back-connection to the first radio manager, the first radio manager has a physical connection with the mobile communicator means, for at least one individual relay from among said plurality of relays, a backhauling link of the individual relay has QoS management functionality in order to support the QoS of at least one of the mobile stations, the at least one individual relay requests at least one bearer each having a defined quality of service, defined by a cellular protocol to characterize a communication channel, from its serving base station, and uses said at least one bearer for supporting the QoS of at least one of the mobile stations, QoS priority management is provided which translates to a quality of service class indicator, used in a cellular protocol governing the network, to differentiate different applications' QoS parameters, per-bearer differentiation in a multi-hop base station relay system is achieved by managing QoS in the at least one of said base stations rather than in a central manager, for different bearers which have different quality of service class indicators and which enter serving base stations, the backhauling link functionality in each relay in said plurality of relays has its own set of predefined backhauling bearers with its own predefined quality of service indication field, the base station functionalities of at least some relays in said plurality of relays are configured to map packets that are sent to the core to the quality of service class indication field, and backhauling link functionalities of at least some relays in said plurality of relays are configured for an inverse mapping of packet classification information to the quality of service indication field.

* * * * *